United States Patent
Takahashi et al.

(10) Patent No.: US 10,436,173 B2
(45) Date of Patent: Oct. 8, 2019

(54) ROTARY DEVICE FOR FLUID POWER GENERATION

(71) Applicant: Nagaoka University of Technology, Niigata (JP)

(72) Inventors: Tsutomu Takahashi, Niigata (JP); Yumiko Yoshitake, Niigata (JP); Nao Komata, Niigata (JP); Yukiko Ueki, Niigata (JP)

(73) Assignee: NAGAOKA UNIVERSITY OF TECHNOLOGY, Niigata (JP)

( * ) Notice: Subject to any disclaimer, the term of this patent is extended or adjusted under 35 U.S.C. 154(b) by 4 days.

(21) Appl. No.: 15/542,184

(22) PCT Filed: Dec. 25, 2015

(86) PCT No.: PCT/JP2015/086353
§ 371 (c)(1),
(2) Date: Jul. 7, 2017

(87) PCT Pub. No.: WO2016/111209
PCT Pub. Date: Jul. 14, 2016

(65) Prior Publication Data
US 2018/0258908 A1    Sep. 13, 2018

(30) Foreign Application Priority Data

Jan. 7, 2015 (JP) ................................. 2015-001885

(51) Int. Cl.
*F03D 1/04* (2006.01)
*F03B 17/06* (2006.01)
(Continued)

(52) U.S. Cl.
CPC .............. *F03D 1/04* (2013.01); *F03B 17/061* (2013.01); *F03B 17/063* (2013.01); *F03D 1/025* (2013.01);
(Continued)

(58) Field of Classification Search
CPC .......... F03D 1/025; F03D 1/0608; F03D 9/25; F03D 3/061; F03B 17/061; F03B 17/063;
(Continued)

(56) References Cited

U.S. PATENT DOCUMENTS

| 4,329,115 A | 5/1982 | Kress |
| 4,366,386 A | 12/1982 | Hanson |

(Continued)

FOREIGN PATENT DOCUMENTS

| DE | 3800070 | 7/1989 |
| GB | 2466209 | 6/2010 |

(Continued)

*Primary Examiner* — Ninh H. Nguyen
*Assistant Examiner* — Jesse M Prager
(74) *Attorney, Agent, or Firm* — Duane Morris LLP; Gregory M. Lefkowitz; Jason M. Nolan

(57) ABSTRACT

Provided are a rotary device for fluid power generation and a fluid power generation device that are capable of converting the kinetic energy of a fluid to an electric energy. By utilizing a longitudinal vortex as a driving force, a rotary body such as a cylinder as a high-strength and tough wing-shaped member can be rotated, and power can be efficiently generated in a wide range of flow rate without letting the longitudinal vortex disappear even if the flow rate changes in a wide range. This rotary device for power generation includes a rotary body 3; and a wake body 8 that is a distance away from the rotary body 3 toward the downstream side of a flow direction 10 of the fluid, and has at least one crossover section at which the wake body 8 intersects with the rotary body 3.

11 Claims, 19 Drawing Sheets

(51) Int. Cl.
*F03D 1/02* (2006.01)
*F03D 1/06* (2006.01)
*F03D 3/06* (2006.01)
*F03D 9/25* (2016.01)

(52) U.S. Cl.
CPC ........... *F03D 1/0608* (2013.01); *F03D 3/061* (2013.01); *F03D 9/25* (2016.05); *F05B 2210/16* (2013.01); *F05B 2240/121* (2013.01); *F05B 2240/301* (2013.01); *F05B 2250/231* (2013.01); *Y02E 10/28* (2013.01); *Y02E 10/721* (2013.01); *Y02E 10/74* (2013.01)

(58) Field of Classification Search
CPC ....... Y02E 10/721; Y02E 10/28; Y02E 10/74; F05B 2240/121; F05B 2240/301; F05B 2250/231; F05B 2110/16; F05D 5/00
See application file for complete search history.

(56) References Cited

U.S. PATENT DOCUMENTS

| | | |
|---|---|---|
| 2009/0031639 A1 | 2/2009 | Cortina/Cordero |
| 2009/0104039 A1* | 4/2009 | Vettese .................. F03D 1/025 416/223 R |
| 2010/0148515 A1 | 6/2010 | Geddry et al. |
| 2012/0141250 A1 | 6/2012 | Kinzie et al. |
| 2015/0132138 A1* | 5/2015 | Herr ......................... F01D 5/12 416/223 A |

FOREIGN PATENT DOCUMENTS

| | | |
|---|---|---|
| JP | 2002357176 | 12/2002 |
| JP | 2003214309 | 7/2003 |
| JP | 2005030317 | 2/2005 |
| JP | 2008011669 | 1/2008 |
| JP | 2008175070 | 7/2008 |
| JP | 2009511817 | 3/2009 |

* cited by examiner

ROTARY DEVICE FOR FLUID POWER GENERATION

CROSS-REFERENCE TO RELATED APPLICATIONS

This application is a is a § 371 national stage entry of International Patent Application No. PCT/JP2015/086353, filed on Dec. 25, 2015, which claims priority to Japanese Patent Application No. 2015-001885, filed on Jan. 7, 2015 the entire contents of which are incorporated herein by reference.

TECHNICAL FIELD

The present invention relates to a rotary device for fluid power generation and a fluid power generating device, and is particularly suitable for an apparatus for converting natural energy such as wind power or hydraulic power into electric energy.

BACKGROUND ART

The most proven energy harvesting system utilizing natural energy in our surroundings is a system of obtaining electric energy from flow energy. The inventors of the present invention have ever proposed, as a power generation apparatus utilizing the system, a vibration power generation device that takes advantage of a longitudinal vortex excitation phenomenon (see, for example, Patent Document 1). This vibration power generation device has a first columnar body arranged such that a longer direction thereof intersects a flowing direction of a fluid and a second columnar body arranged such that a longer direction thereof intersects the first columnar body with a certain distance away from the same. The longitudinal vortex excitation is generated periodically from the vicinity of the intersection between the first columnar body and the second columnar body when the distance between the first columnar body and the second columnar body takes a predetermined value with respect to the diameter of the first columnar body.

On the other hand, a general method of obtaining electric energy from wind power or hydraulic power is turning a generator by rotating a wind turbine or a water wheel. Focusing on wind power generation in particular, propeller-type (horizontal axis type) is mainly used for large wind power generation apparatus. The principle of obtaining its rotational force is that when a propeller-type wind turbine is placed in the flow, an asymmetric flow field is formed around a blade, and thus a lift force is generated in the direction perpendicular to the flow, thus rotating the blade. In such an electric generator with large-scale wind turbine, there are provided reinforcing members inside blades with the increase in size of blades to achieve high output, so that the breakage or deflection of the blades caused by wind resistance and whirl is prevented (See, for example, Patent Document 2).

In addition, with a small scale wind turbine, as a result of having been inspired by wing veins of insects (e.g., dragonfly), veins of vegetation (for example, flying fruits of maple) and the like, there has been a proposal of providing thin blades with protrusions in the form of a leaf vein- or nervure-shaped pattern to increase the strength and performance of wings or blades (for example, see Patent Document 3).

PRIOR ART DOCUMENT

Patent Documents

Patent Document 1: Japanese Un-examined Patent Application Publication No. 2008-11669
Patent Document 2: Japanese Un-examined Patent Application Publication No. 2002-357176
Patent Document 3: Japanese Un-examined Patent Application Publication No. 2005-30317

SUMMARY OF THE INVENTION

Problems to be Solved by the Invention

However, in the conventional wind turbine generators such as the inventions described in Patent Documents 2 and 3, the principle of obtaining a lift force for the blades, that is, the principle of obtaining a rotational force for obtaining electric energy is all the same.

On the other hand, the inventors of the present invention have studied the properties of the longitudinal vortex excitation phenomenon in the development of the vibration power generation device described in the above-mentioned Patent Document 1, and found it out that not only longitudinal vortexes are formed periodically, but the longitudinal vortexes occur only on one side when the first columnar body moves in one direction at a constant speed, and thus a constant lift fore is generated.

The present invention has been made in view of the above circumstances, and it is an object of the present invention to provide a power generation device capable of efficiently generating electric power in a wide range of flow rate without allowing a longitudinal vortex to disappear even if the flow rate changes in a wide range, by utilizing the longitudinal vortex as a driving force, which is based on the unprecedented new findings of a steady lift force being generated due to the longitudinal vortex, in a rotary device for fluid power generation that converts kinetic energy of a fluid into electric energy.

Also, it is another object of the present invention to provide a rotary device for fluid power generation which is allowed to have a high-strength robust airfoil by using a column as a rotating blade and can easily control the lift force by utilizing the new lift-generating principle.

Means to Solve the Problems

In order to solve such problems, the rotary device for fluid power generation according to the present invention comprises a rotary body, and a wake body that is a distance away from said rotary body toward a downstream side of a flow direction of a fluid, and has at least one crossover section at which said wake body intersects with said rotary body.

Effects of the Invention

According to the rotary device for fluid power generation of the present invention, it is possible to provide a rotary device for power generation that is capable of efficiently generating electric power in a wide range of flow rate without allowing a longitudinal vortex to disappear even if the flow rate changes in a wide range, by utilizing the longitudinal vortex as a driving force, based on the unprecedented new findings of a steady lift force being generated due to the longitudinal vortex. Further, since there is no risk of getting overspeed due to low speed and high torque, and the strength of the blades can be increased due to the extremely simple structure, it is possible to provide a safe rotary device for electric generator with less damages caused by breakage of the blades that has ever been the problem in conventional wind power generation devices.

MODE FOR CARRYING OUT THE INVENTION

Figure 1:
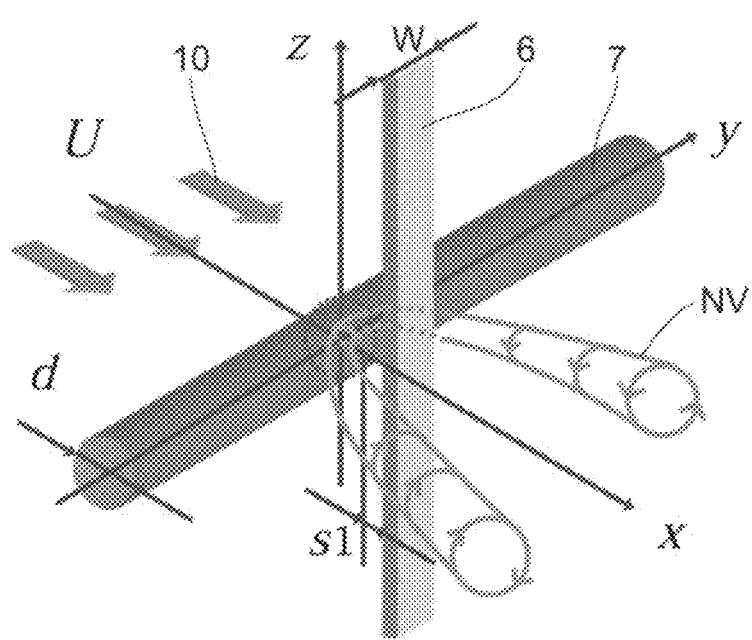
FIG. 1 is a schematic diagram of a longitudinal vortex (necklace vortex) flowing out of a system of cylinder/flat plate.

Before describing a rotary device 1 for fluid power generation of the invention, a principle of generating a steady lift force through a longitudinal vortex is briefly described; the principle was found by the inventors of the invention before the rest of the world. The longitudinal vortex capable of generating a steady lift force is generated under given conditions, using a device having a rotary shaft body 2; a rotary body 3 installed in a way such that it is capable of rotating about the rotary body 2; and a ring-shaped body 4 that is distant from the rotary body 3 in the downstream direction of a fluid, and is coaxial with the rotary shaft body 2. For example, in a case where the rotary body 3 is a columnar body 7, the longitudinal vortex will occur when a separation distance (s2) between the columnar body 7 and the ring-shaped body 4 becomes a given value with respect to a diameter (d) of the columnar body 7.

Figure 2A:
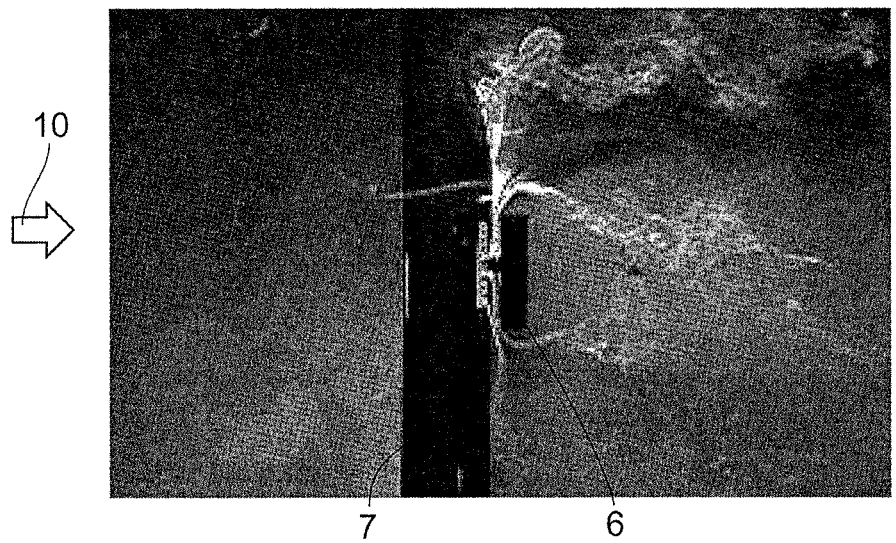
FIG. 2 shows behaviors of the longitudinal vortex: (a) trailing vortex excitation; (b) necklace vortex excitation.
Figure 2B:
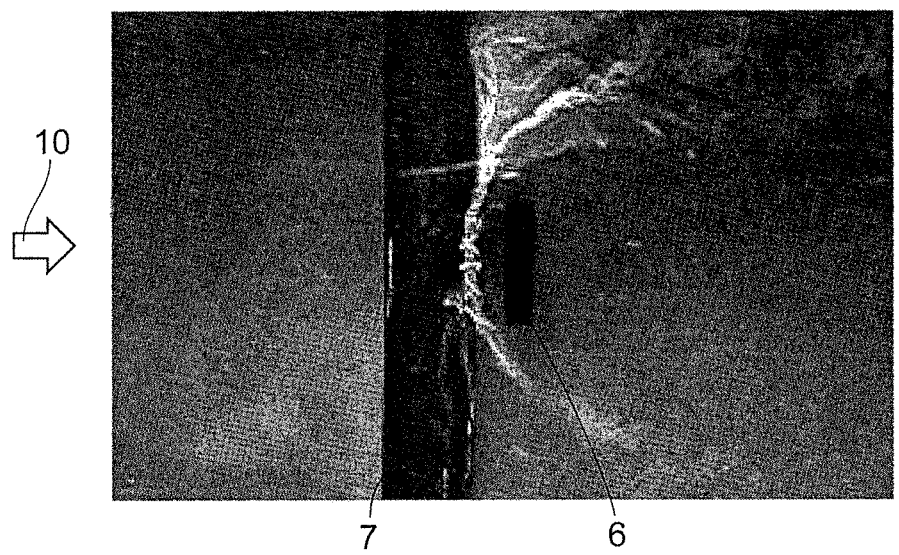

FIG. 1 is a schematic diagram of a device having the columnar body 7 installed in a way such that a longer direction y thereof intersects with a flow direction 10 of a fluid; and a flat plate 6 that is a distance away from the columnar body 7 toward the downstream side of the flow direction 10, and has a longer direction z intersecting with the flow direction 10. FIG. 2 shows forms of the longitudinal vortex generated by the abovementioned device. Here, the form shown in FIG. 2(a) is referred to as a trailing vortex, and the form shown in FIG. 2(b) is referred to as a necklace vortex. Here, the longitudinal vortex shown in FIG. 1 is a schematic image of a necklace vortex NV. The trailing vortex occurs when the value of a separation distance (s1) between the columnar body 7 and the flat plate 6 is smaller than that of the diameter (d) of the columnar body 7. Meanwhile, the necklace vortex NV occurs when the value of the separation distance (s1) between the columnar body 7 and the flat plate 6 is relatively larger than that of the diameter (d) of the columnar body 7. For example, the trailing vortex shown in FIG. 2(a) was observed under conditions of: s1/d=0.08; Reynolds number Re=1695. Further, the necklace vortex NV shown in FIG. 2(b) was observed under conditions of: s1/d=0.28; Reynolds number Re=1735. As it can be seen from these images, the longitudinal vortex occurs in a cyclic manner from the vicinity of the point of intersection between the columnar body 7 and the flat plate 6. It has been observed that the longitudinal vortex exhibits two kinds of forms as a result of slightly changing the separation distance (s1) between the columnar body 7 and the flat plate 6.

Figure 3:
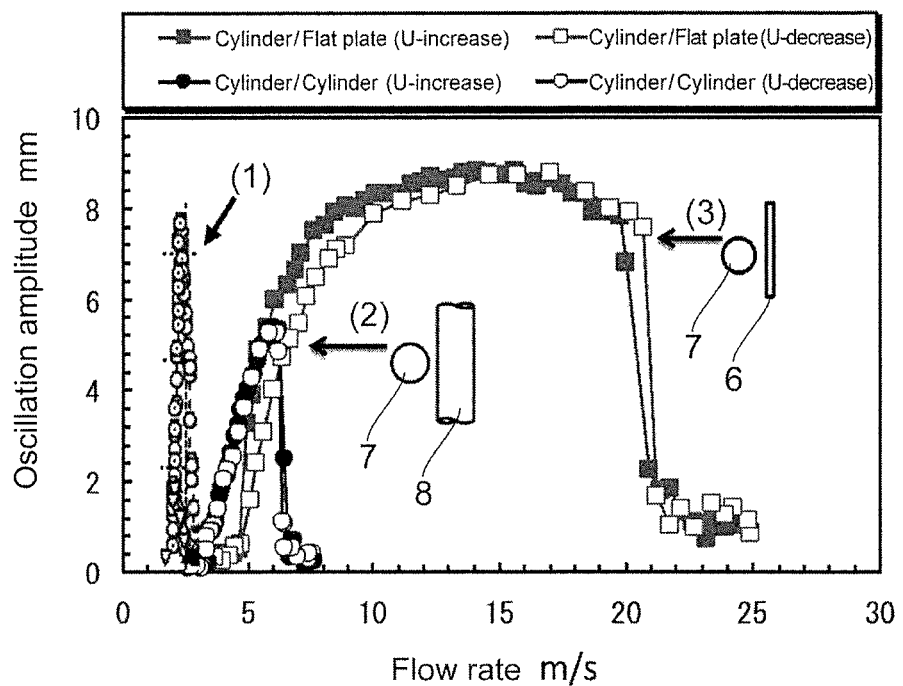
FIG. 3 is a characteristic diagram showing correlations between the flow rates of a fluid and amplitudes in the cases of Karman vortex excitation and longitudinal vortex excitation.

While FIG. 2 shows the observation results of the longitudinal vortex in a water flow, such longitudinal vortex dose not only occur when the fluid is a liquid such as water, but also occurs when the fluid is a gas such as air. FIG. 3 shows experimental results gathered on three kinds of devices, the results indicating the correlations between the flow rate of air and the amplitude of the columnar body 7.

In FIG. 3, data (1) were gathered on a device only having the columnar body 7, and show a correlation between amplitude and flow rate as a result of performing normal Karman vortex excitation. The change in amplitude with respect to flow rate was extremely responsive in a way such that the amplitude would drastically decrease even when the flow rate had slightly changed from a flow rate corresponding to a resonance frequency.

Data (2) were gathered on a device having another columnar body 8 that was a distance away from the columnar body 7 toward the downstream side of an air flow direction, and had a longer direction intersecting with the air flow direction. Data (2) show a correlation between amplitude and flow rate as a result of performing trailing vortex excitation. As compared to Karman vortex excitation, trailing vortex excitation occurs in a range where flow rates are higher, and exhibits a sluggish change in amplitude with respect to flow rate.

Dada (3) were gathered on a device in which the flat plate 6 was a distance away from the columnar body 7 toward the downstream side of the air flow direction 10, and had a longer direction intersecting with the air flow direction 10. Data (3) show a correlation between amplitude and flow rate as a result of performing trailing vortex excitation. Such longitudinal vortex excitation effected by the columnar body 7 and the flat plate 6 is characterized in that oscillations occur in a wide range of flow rate, and that large oscillation amplitudes are observed.

It has been known that as compared to such trailing vortex excitation, the aforementioned necklace vortex excitation occurs in a range where flow rates are higher. Moreover, the change in amplitude with respect to flow rate in the case of the necklace vortex excitation is extremely sluggish in a way such that the amplitude will not diminish, but maintain a large value in a wide range of flow rate.

Based on these data and knowledge, it can be understood that if the necklace vortex excitation can be utilized in wind power generation and hydropower generation, there can be achieved a power generation device capable of generating power in a wide range of flow rate without letting the longitudinal vortex disappear even if the flow rate changes in a wide range.

Figures 4A, 4B:
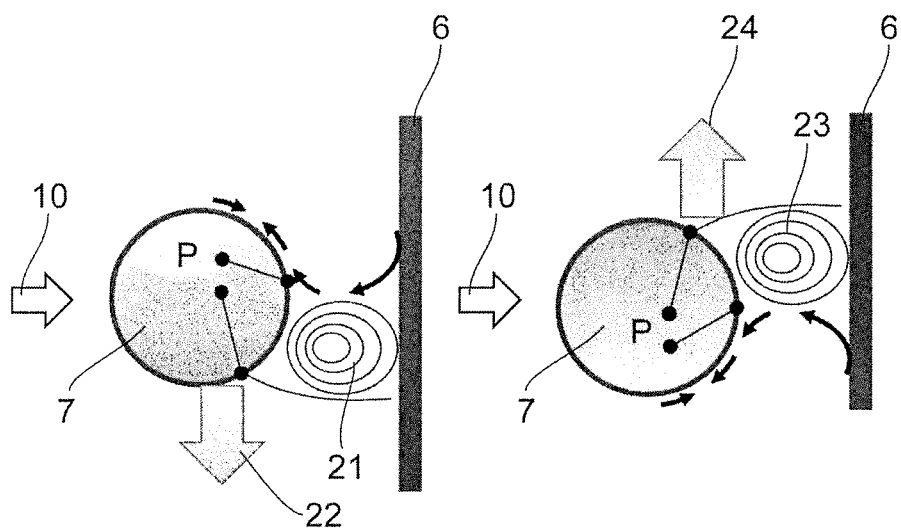
FIG. 4 is a schematic diagram explaining the principle of the occurrence of a conventional longitudinal vortex excitation (parallel oscillation): (a) downward lift force; (b) upward lift force.

With regard to the device mentioned in (3), the parallel oscillation of the columnar body 7 in the case of the necklace vortex excitation is considered to be attributed to a principle shown in FIG. 4. That is, as shown in FIG. 4(*a*), in a space between the columnar body 7 and the flat plate 6, a longitudinal vortex 21 is generated in an area below the center of the columnar body 7, and the columnar body 7 generates a downward force 22. Particularly, an adverse current occurs on the downstream side of a separation point P, and a vortex area is formed therebehind. Later, in the space between the columnar body 7 and the flat plate 6, a longitudinal vortex 23 is generated in an area above the center of the columnar body 7, and the columnar body 7 generates an upward force 24. As is the case described above, an adverse current occurs on the downstream side of the separation point P, and a vortex area is formed therebehind. In this way, the longitudinal vortexes 21, 23 are alternately generated in the upper and lower areas of the columnar body such that an oscillation force can be developed, thereby allowing a longitudinal vortex excitation phenomenon to occur.

In contrast, it became clear that the longitudinal vortex was stably generated only on one side of the columnar body, if the columnar body 7 moved at a constant speed in a direction orthogonal to the flow direction 10 of a fluid. That is, as a result of moving the columnar body 7 downward at a constant speed from the state shown in FIG. 4 (*a*), the longitudinal vortex will be generated between the columnar body 7 and the flat plate 6 in a fashion such that the longitudinal vortex will only be formed in one area with respect to the center of the columnar body 7. The flow field will become asymmetric due to such movement, and a lift coefficient will thus exhibit a negative slope such that a constant force will then act in a direction orthogonal to a current U. This is analogous to the galloping phenomenon as an unstable oscillation. In this way, the principle of generating a steady lift force by the longitudinal vortex is assumed as follows. That is, the longitudinal vortex will be stably formed on one side of the columnar body 7 in response to the moving speed of the columnar body, and a stronger force will be generated as the speed increases.

The inventors of the present invention applied this principle and made the following findings. That is, by turning the flat plate 6 into the ring-shaped body 4, the columnar body 7 is able to rotate at a constant rotation rate about the flow direction 10 as an axis, in the space between the columnar body 7 and the flat plate 6 where conditions for generating the longitudinal vortex (necklace vortex) are presented. Further, it also became clear that by gently pushing the columnar body 7 in an inverse rotation direction after forcibly stopping the rotation of the same, the columnar body 7 would rotate at the same speed in such direction. As a method of rotating the columnar body 7 in a desired rotation direction, there is, for example, a method of allowing the columnar body 7 to rotate only in one direction through mechanisms such as the ratchet mechanism and one-way clutch. Moreover, by turning a portion of the columnar body 7 as the rotary body 3 that is slightly distant from the ring-shaped body 4 (a portion close to front end or base) into a normal wing shape, the columnar body 7 can rotate in a desired direction by the flow force of a fluid, and the rotation is capable of being triggered at the start of the rotation, without installing a mechanical device.

FIRST EMBODIMENT

Figure 5:
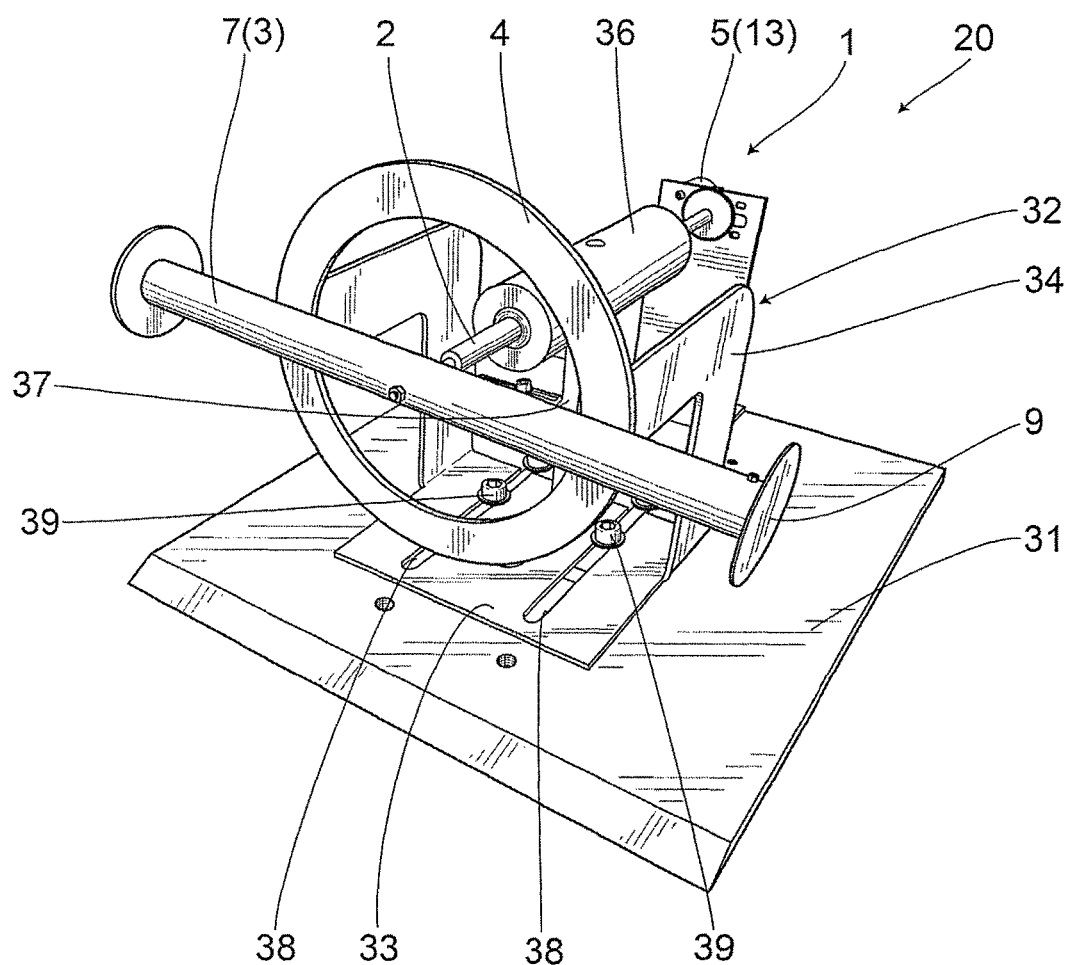
FIG. 5 is a photograph showing a perspective view of a first embodiment of the invention.
Figure 6:
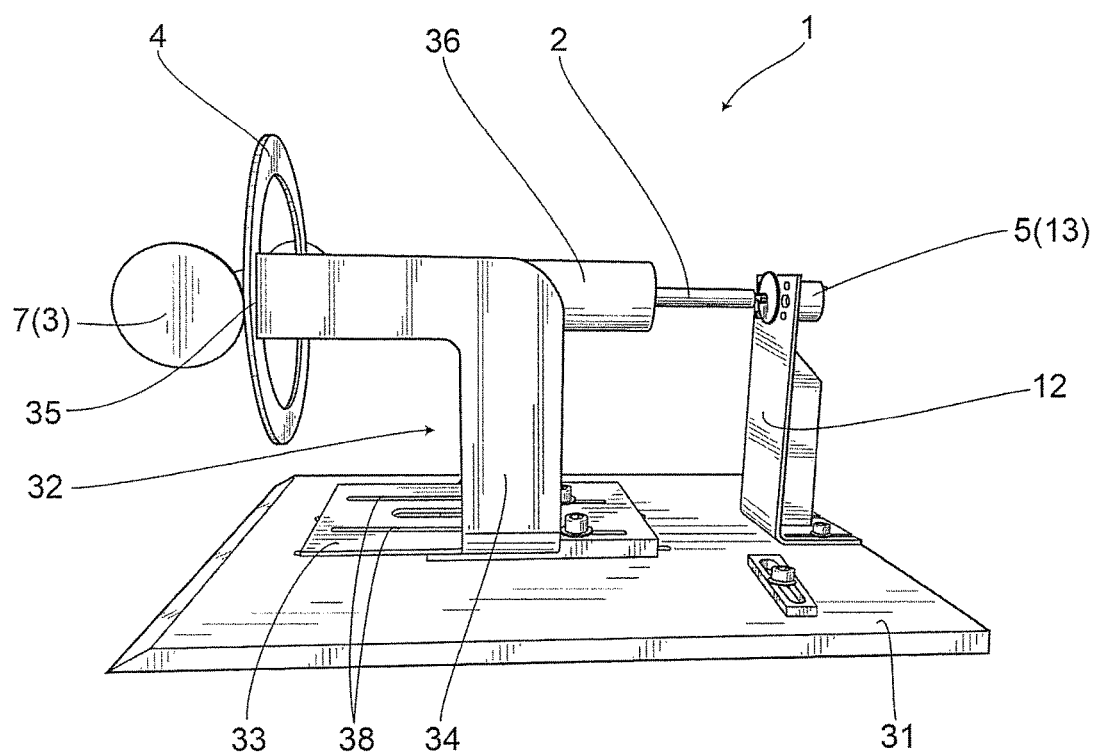
FIG. 6 is a photograph showing a side view of the first embodiment of the invention.
Figure 7:
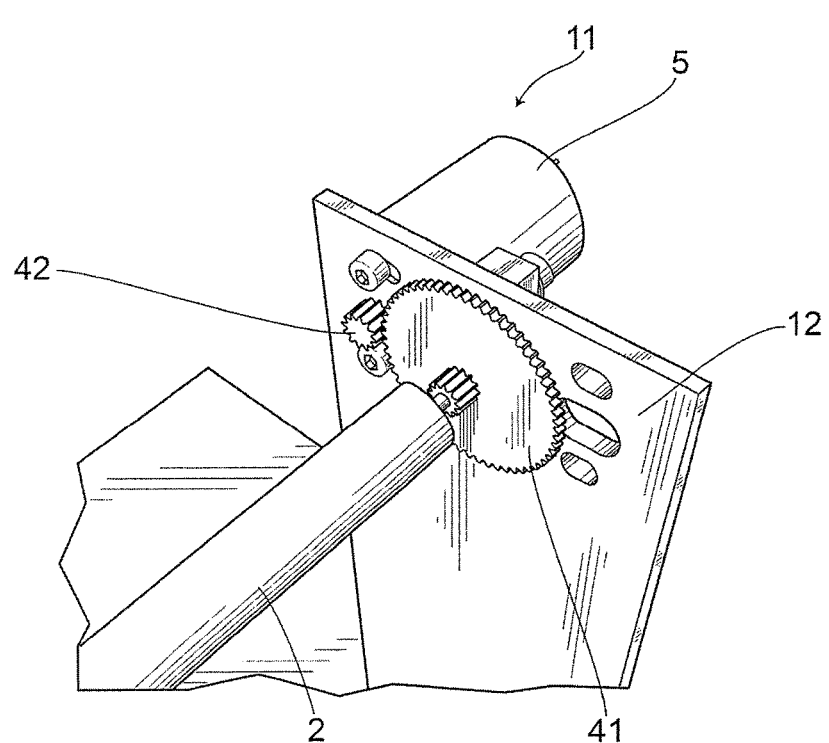
FIG. 7 is a photograph showing a perspective view of a power generation portion in the first embodiment of the invention.

The rotary device 1 for fluid power generation of the invention is described hereunder with reference to the accompanying drawings. FIG. 5 is a photograph showing a perspective view of a first embodiment of the rotary device 1 for power generation that is used in a fluid U, and FIG. 6 is a photograph showing a side view of the device. FIG. 7 is a photograph showing a perspective view of a power generation portion 11 in FIG. 5 and FIG. 6.

This embodiment includes the rotary shaft body 2; the columnar body 7 as the rotary body 3 installed in the way such that it is capable of rotating about the rotary body 2; a ring-shaped body 4 as a wake body 8 that is a distance away from the columnar body 7 toward the downstream side of the flow direction 10 of a fluid; and a electric generator 5 generating power as the rotary shaft body 2 rotates. Here, the ring-shaped body 4 is coaxial with the rotary shaft body 2.

The columnar body 7 may, for example, have a circular shape in a cross-sectional view, and it is preferred that the columnar body 7 be installed in a way such that it can rotate about the rotary shaft body 2 in a plane orthogonal to the flow direction 10 of the fluid. The columnar body 7 as the rotary body 3 can be efficiently rotated as a result of being positioned orthogonal to the flow direction 10 of the fluid.

There may also be provided on the two ends of the columnar body 7 end plates 9 each having a diameter larger than the cross-sectional diameter (d) of the columnar body 7.

Figure 8:
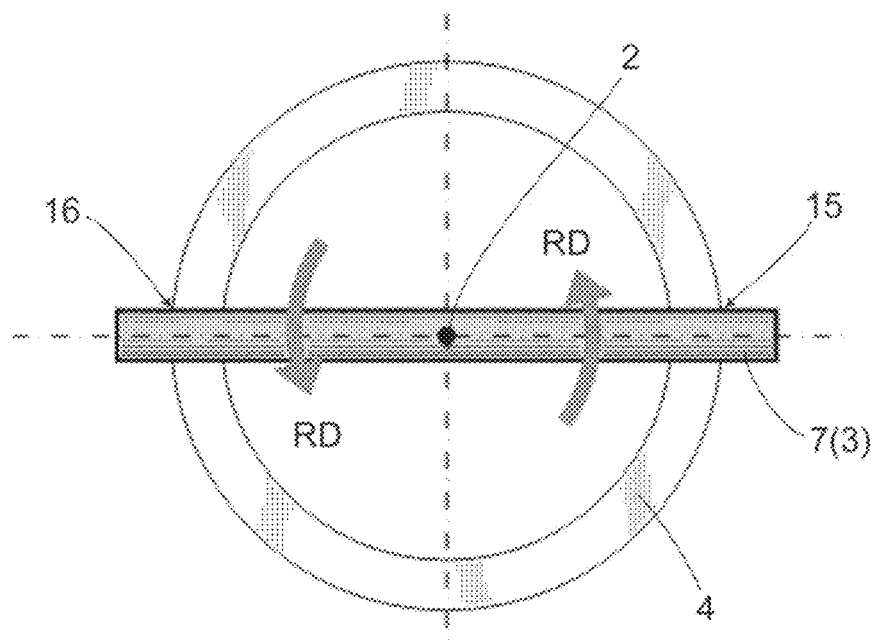
FIG. 8 is a schematic front view explaining a rotation principle of a columnar body in the first embodiment of the invention.

The ring-shaped body 4 as the wake body 8 is, for example, a ring-shaped flat plate. In this embodiment, the ring-shaped body 4 has a constant width (W) on the entire circumference. However, rather than a flat plate, the ring-shaped body 4 may also have a cylindrical shape with a large thickness. With the rotary body 3 remaining at rest, the ring-shaped body 4 has at least one crossover section where the ring-shaped body 4 intersects with the rotary body 3 in the planar view. Such crossover section allows the longitudinal vortex (necklace vortex) to be generated. In FIG. 8, with the rotary body 3 staying at rest, the ring-shaped body 4 has two crossover sections 15, 16 across the rotary shaft body 2. Therefore, a stronger rotational force can be achieved. However, the crossover sections 15, 16 shift along the ring-shaped body 4 as the rotary body 3 rotates. Further, for example, when there is only one crossover section, it coincides with the case where a single-blade rotary body 3 is employed. When the rotary body 3 is single-blade, it may be reasonable to attach a counter weight (weight) to one end thereof. Also, when the rotary body 3 is triple-blade, there may be established three crossover sections.

A bottom plate 31 is to be laid on the bottom surface of a flow passage through which a fluid such as air or water flows, followed by mounting the rotary device 1 for power generation on such bottom plate 31. Provided on the bottom plate 31 is a ring shaped body-holding portion 32 for supporting and holding the ring-shaped body 4. In this embodiment, the ring shaped body-holding portion 32 includes a fixation plate 33 that is to be fixed to the bottom plate 31; and an L-shaped ring shaped body-supporting plate 34 vertically rising from the fixation plate 33 and being bent at a right angle toward the front of the rotary device 1 for power generation i.e. the upstream side of the current of the fluid. The ring-shaped body 4 is a flat plate having a ring-like shape, and has a constant ring width (W). The ring-shaped body 4 is to be installed in a manner such that it will be supported by a ring shaped body-mounting portion 35 provided on the front region of the ring shaped body-supporting plate 34. The rotary shaft body 2 passes through the center of the ring-shaped body 4, and is rotatably supported by a electric generator supporting plate 12. The numerical symbol "36" represents a rotary shaft body cover. The rotary shaft body cover 36 is supported by a supporting pole 37 vertically rising from the bottom plate 31.

The front end of the rotary shaft body 2 is to be connected to the center of the columnar body 7 in a manner such that the longer direction y of the columnar body 7 and the diametrical direction of the ring-shaped body 4 will become parallel to each other. That is, the columnar body 7 rotates while maintaining a constant separation distance (s2) from the ring-shaped body 4. Further, the columnar body 7 is a distance away from the ring-shaped body 4 toward the upstream side of the flow direction 10 of the fluid. Furthermore, the columnar body 7 and the ring-shaped body 4 are coaxial with the rotary shaft body 2. Particularly, when installing the rotary device 1 for power generation, it is preferred that the device be installed in a fashion such that the columnar body 7 as the rotary body 3 will be able to rotate about the rotary shaft body 2 in the plane orthogonal to the flow direction 10 of the fluid.

Figure 11:
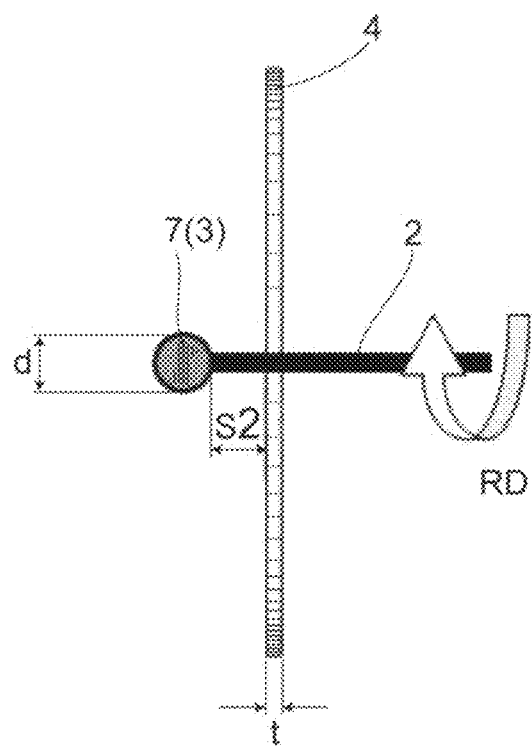
FIG. 11 is a side view of the above geometric factors.

The fixation plate 33 of the ring shaped body-holding portion 32 may, for example, have a slit(s) 38 parallel to the current U of the fluid. The fixation plate 33 is fixed to the bottom plate 31 through a fixation member 39, at a given location in the slit(s) 38. This slit 38(s) allow the ring-shaped body 4 to move back and forth and be fixed at a given location, thus, as shown in FIG. 11, making it possible to easily change the separation distance (s2) between the columnar body 7 and the ring-shaped body 4. Therefore, an appropriate value of s2/d can be employed in response to the flow rate of a fluid such as air or water in an environment where the rotary device 1 for fluid power generation of the invention is installed, thereby allowing the necklace vortex excitation to reliably occur or disappear.

In FIG. 7, the terminal end of the rotary shaft body 2 is connected to a large gear 41. A small gear 42 interacts with the large gear 41; and as the small gear 42 rotates, the electric generator 5 will be rotated to generate electric power. The electric generator 5 in this embodiment is a distance away from the ring-shaped body 4 toward the downstream side of the flow direction 10 of the fluid, and serves to generate electric power as the rotary shaft body 2 rotates. In this way, the rotary device 1 for fluid power generation of the invention constitutes a power generation device 20 utilizing a fluid. Particularly, as the electric generator 5, there can be used an existing rotary electric generator 13.

Figure 9:
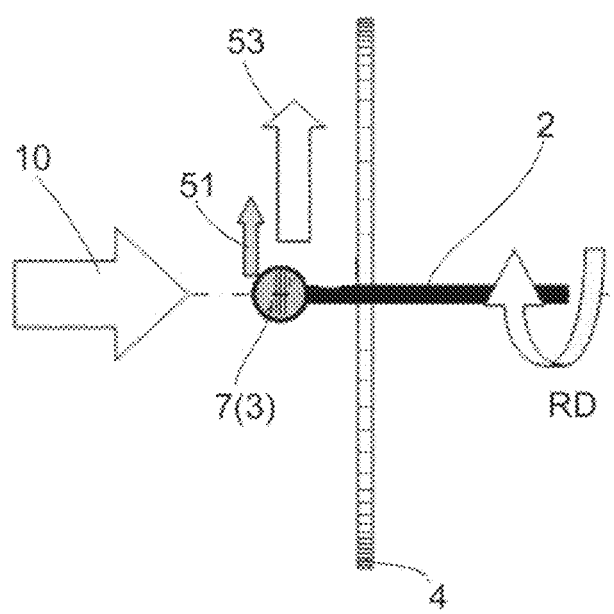
FIG. 9 is a schematic side view explaining the rotation principle of the columnar body in the first embodiment of the invention.
Figure 10:
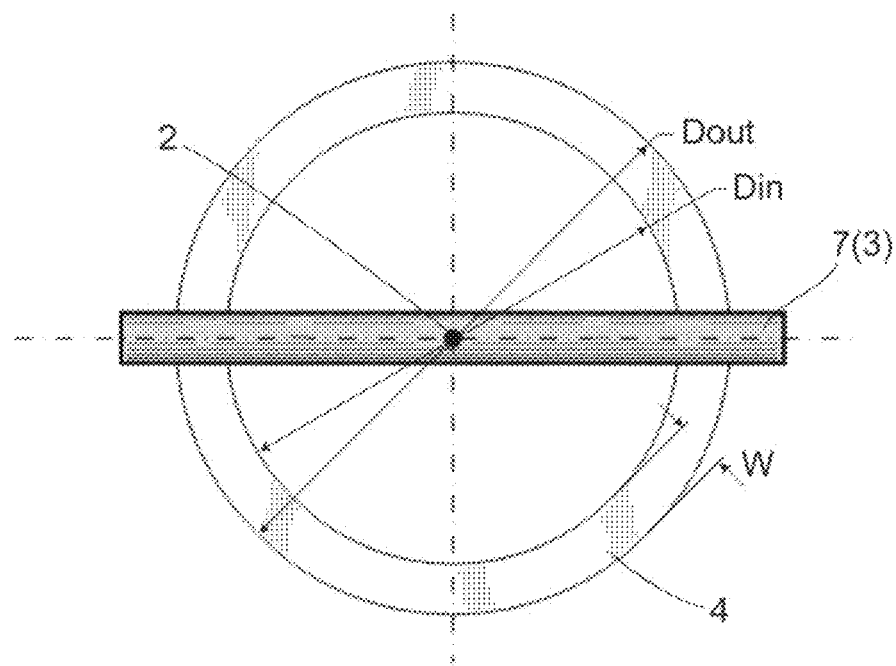
FIG. 10 is a front view showing geometric factors of a cylinder and a ring-shaped body that affect the rotation principle of the present embodiment.

FIG. 8 is a schematic front view explaining a rotation principle of the columnar body 7 as the rotary body 3. FIG. 8 shows how the columnar body 7 rotates in the direction indicated by an arrow RD i.e. counterclockwise. FIG. 9 shows how a lift force 51 is developed at the crossover section 15 shown in FIG. 8. As described above, the longitudinal vortex will occur between the columnar body 7 and the ring-shaped body 4, when the separation distance (s2) becomes a given value with respect to the diameter (d) of the columnar body 7. This longitudinal vortex allows the columnar body 7 to develop the lift force 51 upward as shown in the drawing. In this embodiment, the ring-shaped body 4 is a ring-shaped flat plate having the constant ring width (W) shown in FIG. 10. Therefore, as the columnar body 7 moves upward, the longitudinal vortex, in response to a moving speed 53, will be continuously and stably formed on one side of the columnar body 7. Further, as the speed increases, a stronger force i.e. the steady lift force 51 will be generated. When the upward lift force 51 is generated at the crossover section 15 shown in FIG. 8, a downward steady lift force will likewise be generated simultaneously at the crossover section 16 under a similar principle, thereby achieving a stronger rotational force. Here, a clockwise rotation is also possible under a similar principle as that shown in FIG. 8 and FIG. 9 in which the counterclockwise rotation is explained.

Figure 12:
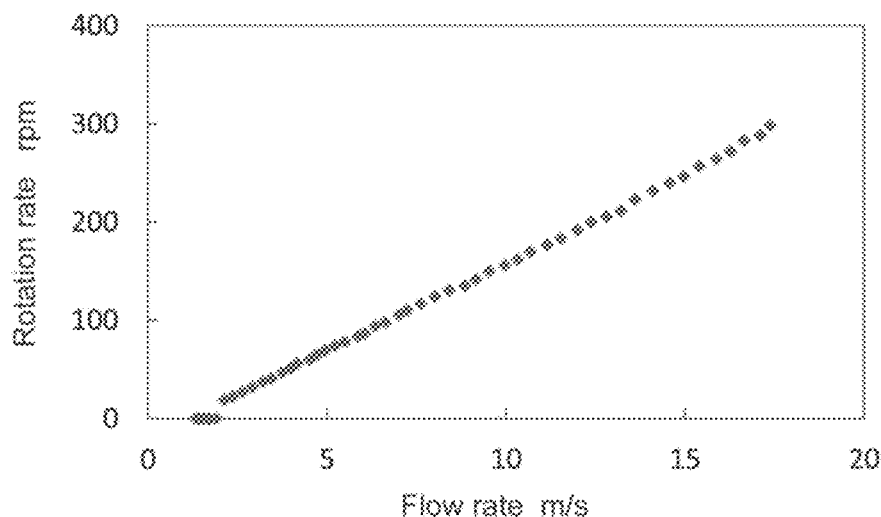
FIG. 12 is a characteristic diagram showing a correlation between the flow rate of a fluid and a rotation rate of the columnar body in the first embodiment of the invention.

As described above, as a condition for the rotation of the columnar body 7, the separation distance (s2) between the columnar body 7 and the ring-shaped body 4 is important. It has been known that this separation distance (s2) is substantially identical to the condition for generating the necklace vortex NV. Further, as shown in FIG. 12, the rotation rate of the columnar body 7 increases in proportion to the flow rate of a fluid. For example, the rotation rate was 74 rpm, when the flow rate of a fluid was 5.2 m/s; and the rotation rate was 162 rpm, when the flow rate of a fluid was 10.3 m/s. These experimental results were obtained through measurements performed on the following device. That is, with regard to the geometric factors shown in FIG. 10 and FIG. 11, the device used had a ring outer diameter ($D_{out}$) of 174 mm, a ring inner diameter ($D_{in}$) of 134 mm, a ring width (W) of 20 mm, a ring thickness (t) of 3 mm and a diameter (d) of the columnar body 7 of 20 mm, in which the separation distance (s2) was 10 mm.

Figure 13:
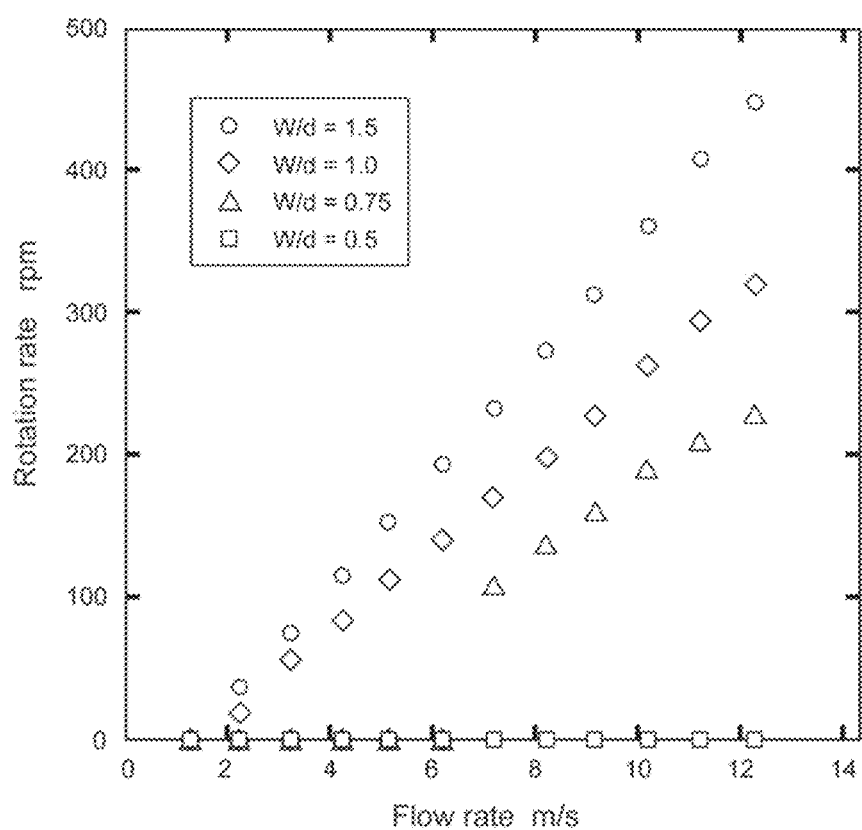
FIG. 13 is a graph showing a correlation between a ring width and the rotation rate under an unloaded condition in the first embodiment of the invention.

FIG. 13 is a graph showing a correlation between the ring width (W) and the rotation rate under an unloaded condition. A device having a ring diameter D ($=(D_{out}+D_{in})/2$) of 155 mm and a diameter (d) of the columnar body 7 of 21 mm was employed, and the rotation rate was measured under various ring widths (W) with the separation distance (s2) being 7.3 mm.

Rotation did not take place when W/d was 0.5. However, when W/d was not smaller than 0.75, the rotation rate increased as the ring width (W) increased. The increase in ring width increases the air volume of the high pressure part at the front. Thus, the volume of the air flowing into the back side of the columnar body 7 will increase so as to improve the driving force, thereby causing the rotation rate to be increased.

Figure 14:
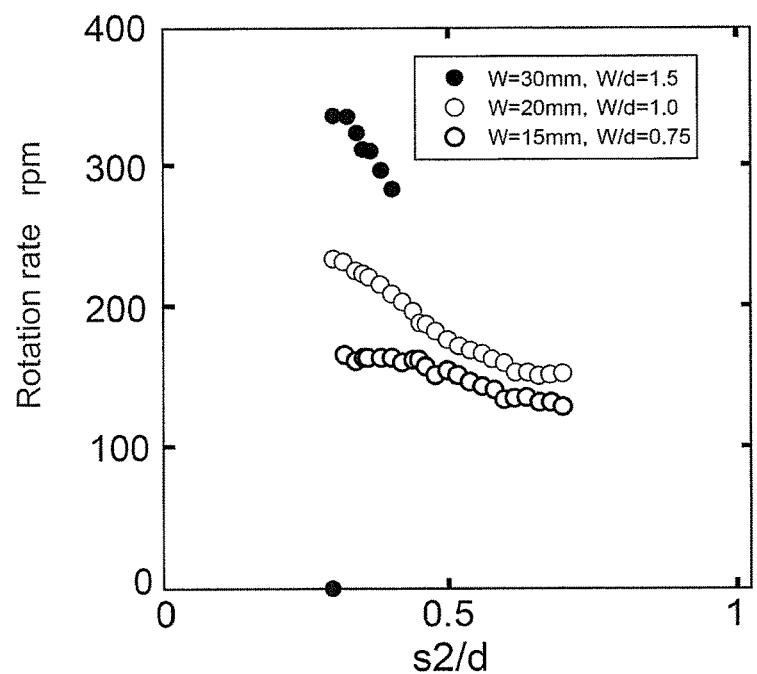
FIG. 14 is a graph showing a correlation between a ratio of a gap and the diameter of the columnar body 7; and the rotation rate, in the first embodiment of the invention.

FIG. 14 is a graph showing a correlation between the ratio (s2/d) of the separation distance (s2) and the diameter (d) of the columnar body 7; and the rotation rate. A device having a ring diameter D ($=(D_{out}+D_{in})/2$) of 155 mm and a diameter (d) of the columnar body 7 of 21 mm was employed, and the rotation rate was measured at various ratios (s2/d) with the flow rate being 9 m/s.

The rotation rate reached its maximum when the ratio (s2/d) was 0.35. When the ratio (s2/d) was not lower than 0.35, the rotation rate decreased as the ratio (s2/d) increased. Rotation stopped when the ratio (s2/d) was lower than 0.3. Therefore, by adjusting the separation distance (s2), the rotational force can be controlled, and the device can thus be used in a wide range of wind speed. Further, in terms of stopping the wind turbine, the wind turbine can be reliably stopped under a simple structure by adjusting the separation distance (s2).

SECOND EMBODIMENT

Figure 15:
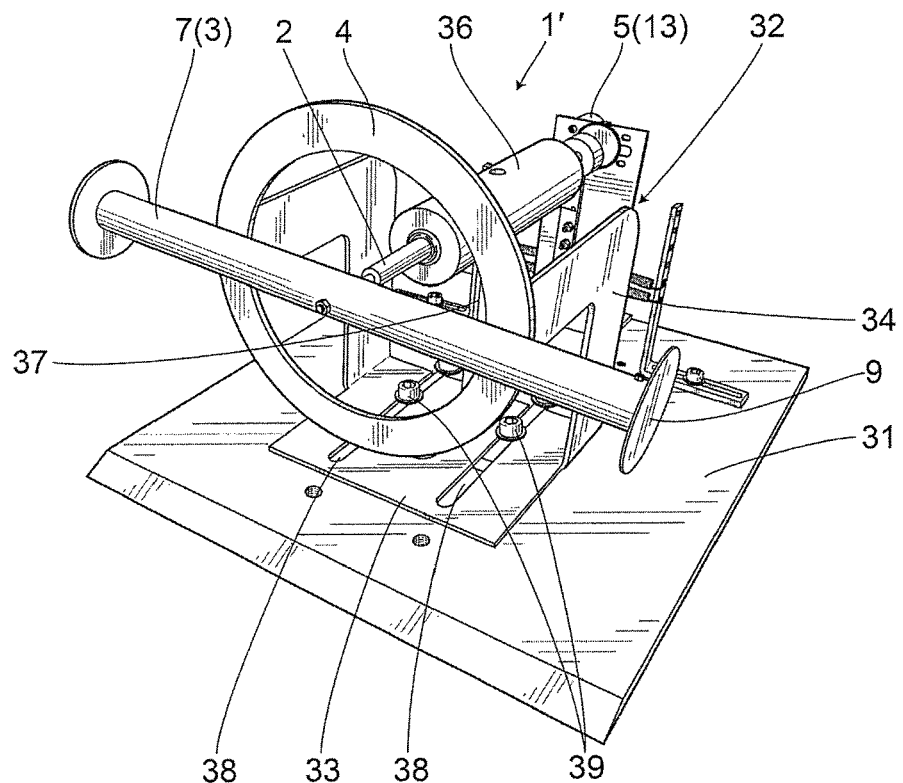
FIG. 15 is a photograph showing a perspective view of a second embodiment of the invention.
Figure 16:
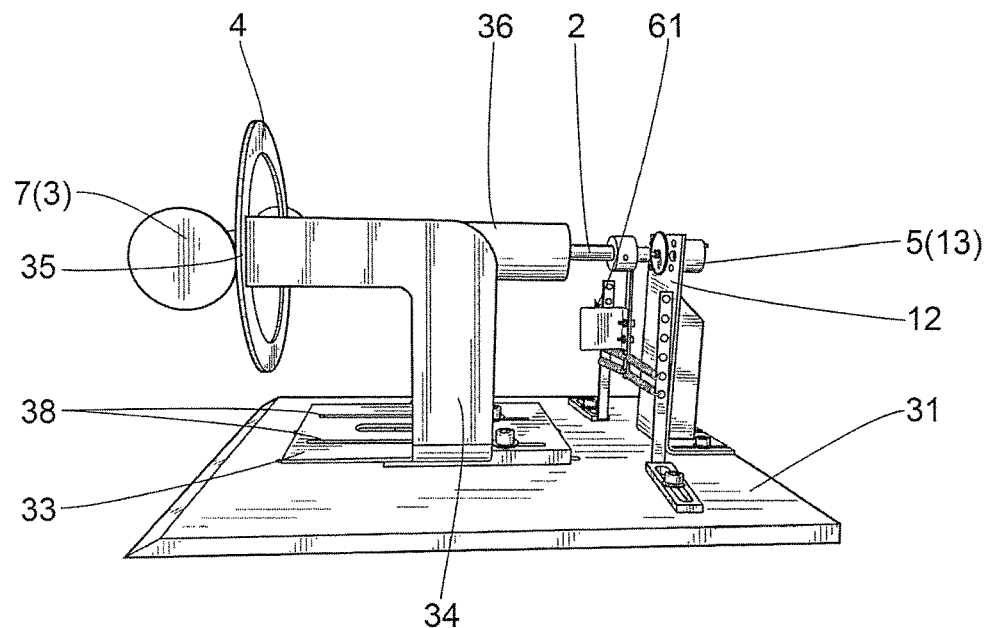
FIG. 16 is a photograph showing a side view of the second embodiment of the invention.
Figure 17:
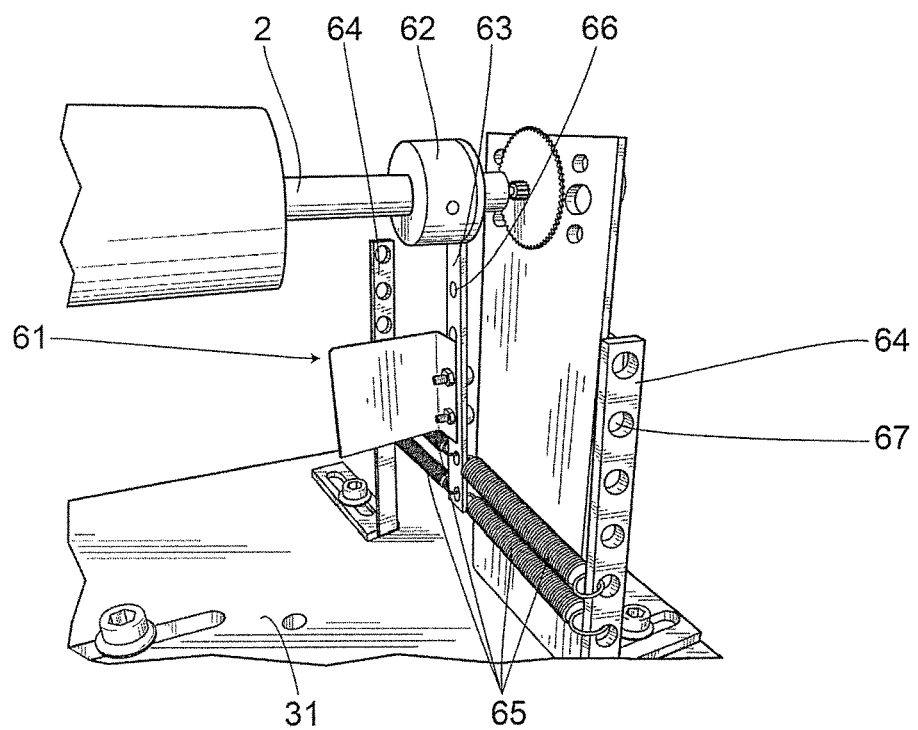
FIG. 17 is a photograph showing a perspective view of an eigenfrequency adjusting portion effected by a spring(s) as elastic bodies in the second embodiment of the invention.
Figure 18:
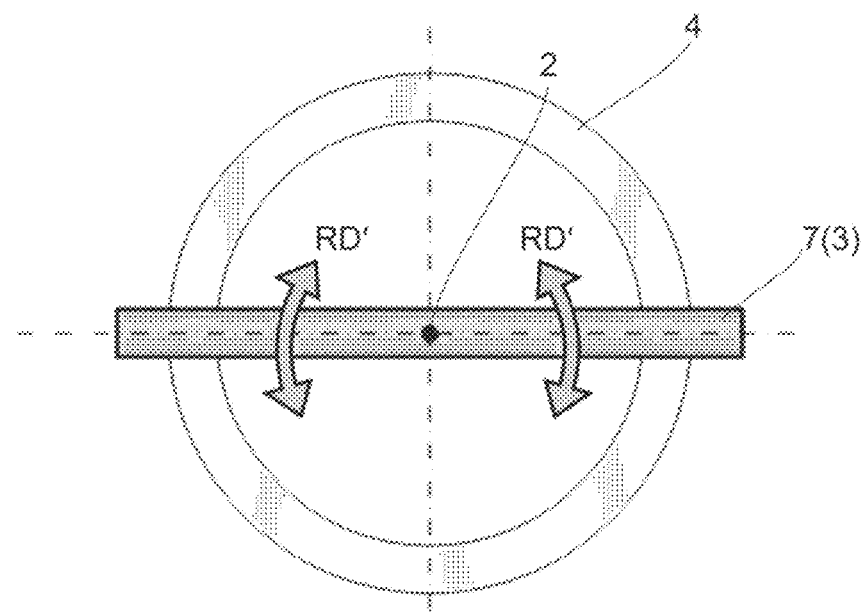
FIG. 18 is a schematic front view explaining an angular oscillation principle of a columnar body in the second embodiment of the invention.

FIG. 15 to FIG. 18 show a second embodiment of the invention. Elements identical to those in the above embodiment are given identical symbols, and the detailed descriptions thereof are thus omitted. FIG. 15 is a photograph showing a perspective view of a rotary device 1' for fluid power generation, and FIG. 16 is a photograph showing a side view of the device. The basic structure of this device is the same as that of the first embodiment. The device of the second embodiment differs from the device of the first embodiment in that an eigenfrequency adjusting portion 61 effected by a spring(s) as elastic bodies shown in FIG. 17 is provided between the ring-shaped body 4 and the electric generator 5 in a way such that the eigenfrequency adjusting portion 61 is capable of angularly oscillating the rotary body 3.

The eigenfrequency adjusting portion 61 includes a rotary trunk 62 and a rotary flat plate 63 that are fixed to the rotary shaft body 2 and rotate as the rotary shaft body 2 rotates; spring supporting plates 64 symmetrically rising from the bottom plate 31, on both the left and right sides of the rotary shaft body 2; and a spring(s) 65 with one end thereof connected to the rotary flat plate 63 and the other end thereof connected to the spring supporting plate 64. The spring(s) 65 are fixed to a plurality of holes 66 provided on the rotary flat plate 63, and to a plurality of holes 67 provided on the spring supporting plate 64, in a manner such that the spring(s) 65 are horizontal to the bottom plate 31. In FIG. 17, although two springs 65 are fixed on each of the left and right sides of the rotary shaft body 2, the number of the springs 65 is not limited to such number.

The rotary flat plate 63 rotates in a given rotation range as the rotary shaft body 2 rotates, thereby allowing the spring(s) 65 connected to the rotary flat plate 63 to elongate and contract. Therefore, unlike the first embodiment, the columnar body 7 as the rotary body 3 rotates in a reciprocating manner in a given range of angle of rotation RD', due to the function of the eigenfrequency adjusting portion 61 effected by the springs. This rotation is referred to as angular oscillation. The principle for generating the rotational force is similar to that of the first embodiment. The oscillation frequency for angular oscillation can be adjusted by changing the spring constant of the eigenfrequency adjusting portion 61 effected by the spring(s).

THIRD EMBODIMENT

Figure 19:
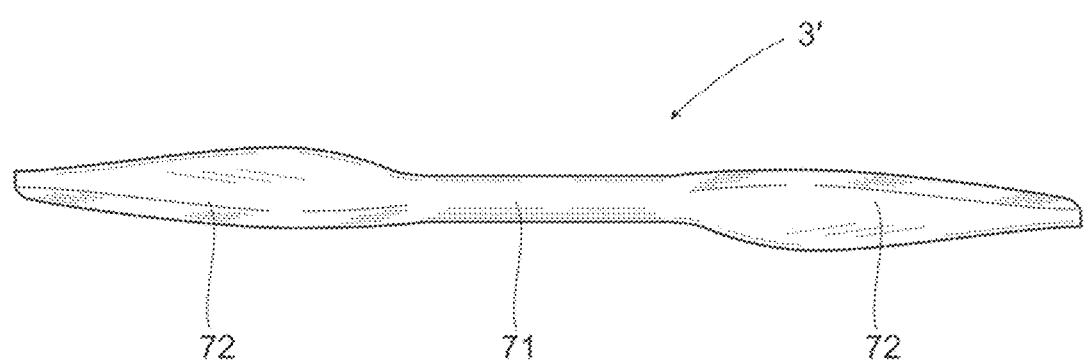
FIG. 19 is a front view showing a rotary body in a third embodiment of the invention.

FIG. 19 shows a rotary body 3' of a third embodiment of the invention. The device of this embodiment is such that a propeller wing-shaped blade is now provided on both ends of the columnar body 7, instead of employing the rotary body 3 that is composed of the columnar body 7 alone as are the cases in the rotary devices 1, 1' for power generation of the first and second embodiments. That is, the rotary body 3' has a cylindrical columnar portion 71 exhibiting, for example, a circular cross-section; and a propeller wing-shaped portion 72 formed on both ends of the columnar portion 71. Such configuration makes it possible to increase the rotational force of the rotary body 3' that is associated with the current of a fluid. However, the shape of the wing-shaped portion is not limited to that shown in FIG. 19. Further, the ring-shaped body 4 may intersect with the rotary body 3' either on the downstream side of the columnar portion 71, or on the downstream side of the wing-shaped portion 72.

FOURTH EMBODIMENT

Figure 20:
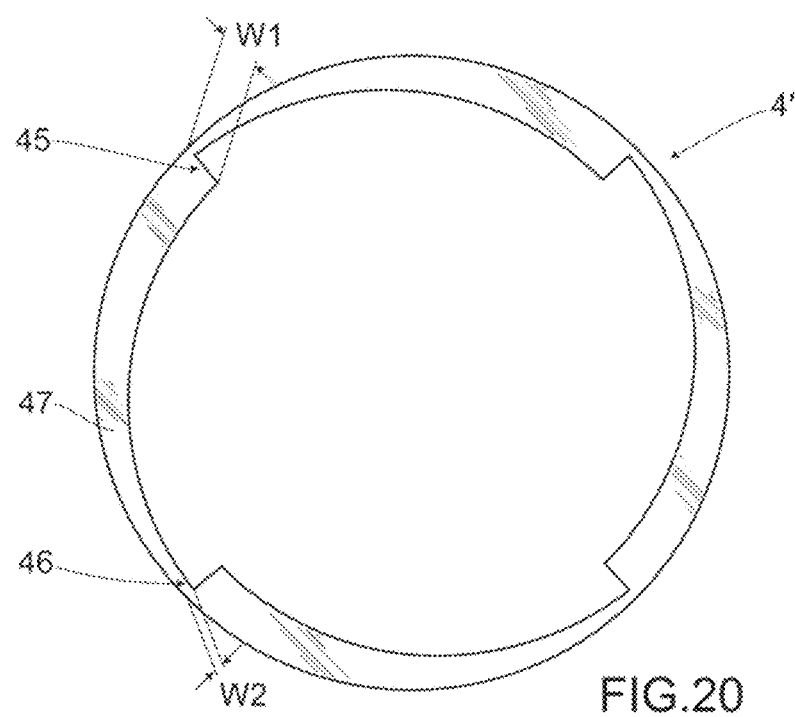
FIG. 20 is a front view showing a ring-shaped body in a fourth embodiment of the invention.

FIG. 20 shows a ring-shaped body 4' as the wake body 8 in a fourth embodiment of the invention. In this embodiment, a surface 47 of the ring-shaped body 4' that faces the rotary body 3 i.e. a surface 47 in contact with the current 10 of a fluid in a substantially perpendicular manner, has a wide width portion 45 and a narrow width portion 46 having a width narrower than that of the wide width portion 45. Further, the ring-shaped body 4' has a portion where a wide ring width (W1) of the wide width portion 45 gradually narrows toward a narrow ring width (W2) of the narrow width portion 46. In this way, the ring-shaped body 4' is formed by allocating four portions with various ring widths (W) along the circumferential direction in a manner such that each portion is established every quarter of the circumference. This configuration makes it possible to control the rotation direction such that rotation will automatically start in one direction, and improve the rotational force of the rotary body 3. However, the number of the above portions with various ring widths (W) is not limited to four, but may be appropriately changed. Moreover, it is preferred that these portions be provided at a constant interval.

FIFTH EMBODIMENT

Figure 21:
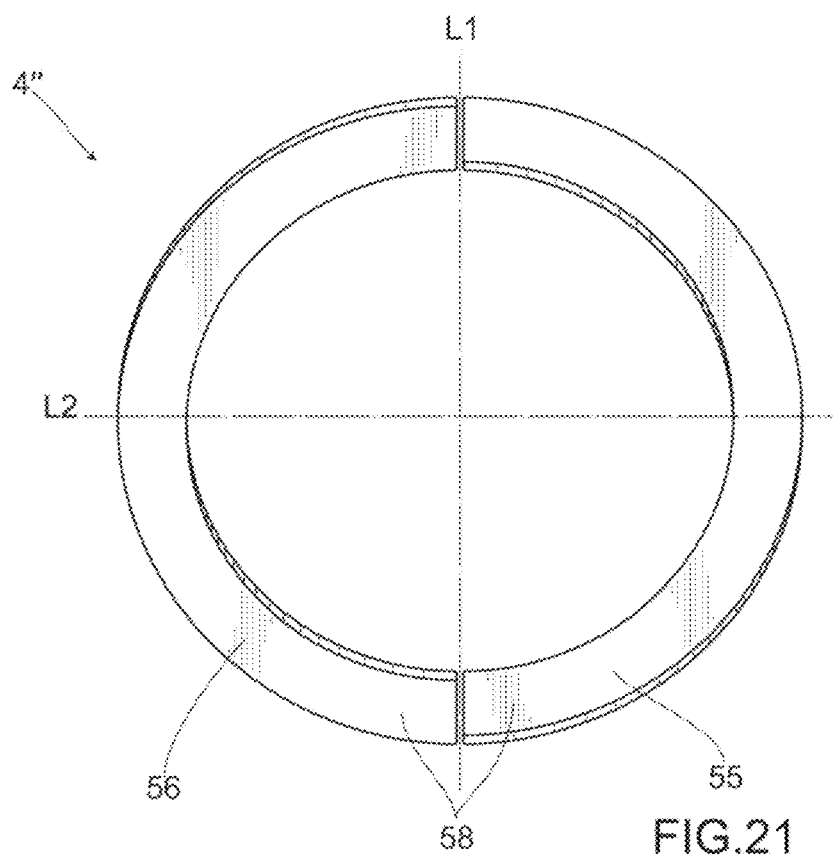
FIG. 21 is a front view showing a ring-shaped body in a fifth embodiment of the invention.
Figure 22:
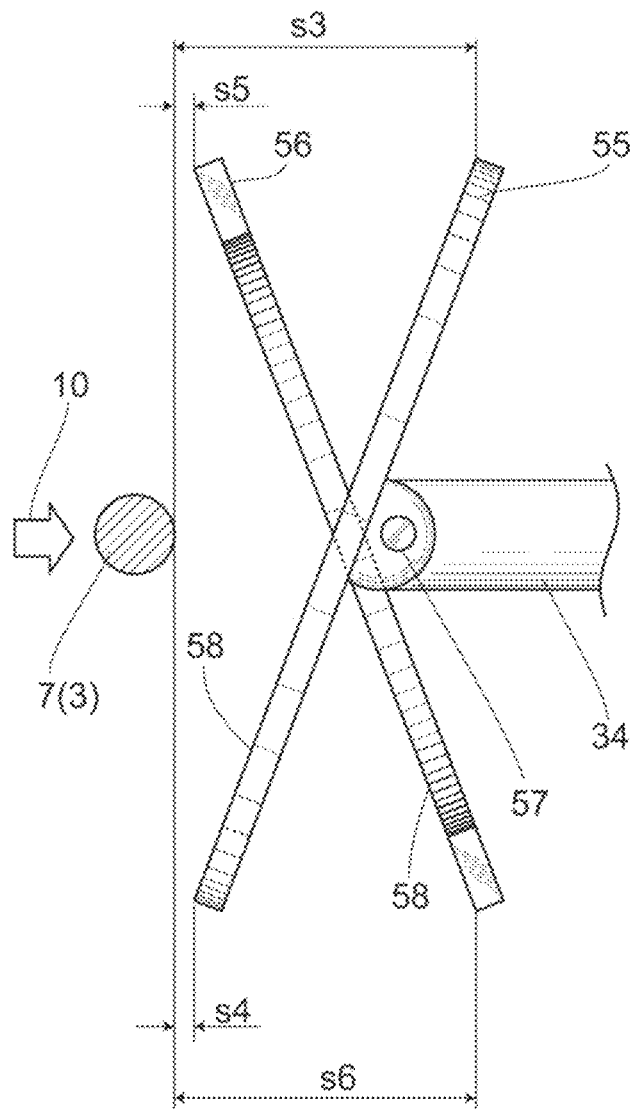
FIG. 22 is a side view showing the fifth embodiment of the invention.

FIG. 21 and FIG. 22 show a ring-shaped body 4" as the wake body 8 in a fifth embodiment of the invention. In this embodiment, the ring-shaped body 4 of the first embodiment that is composed of a ring-shaped flat plate is now turned into a shape divided in half along a line L1 of the diametrical direction i.e. divided into a first divisional body 55 and a second divisional body 56. Both the first divisional body 55 and the second divisional body 56 are attached to the ring shaped body-supporting plate 34 in a way such that they are rotatable about a divisional body rotation shaft 57, and that it is possible to change the angle of a surface 58 facing the rotary body 3 i.e. a surface 58 in contact with the current 10 of a fluid.

That is, the first divisional body 55 and the second divisional body 56 are installed in a manner such that they are capable of mutually swinging about a line L2 of the diametrical direction that is orthogonal to the line L1. In FIG. 20, the first divisional body 55 is fixed in a way such that a distance (s3) between the upper end portion thereof and the columnar body 7 as the rotary body 3 is larger than a distance (s4) between the lower end portion thereof and the columnar body 7. Further, the second divisional body 56 is fixed in a way such that a distance (s5) between the upper end portion thereof and the columnar body 7 is smaller than a distance (s6) between the lower end portion thereof and the columnar body 7. Preferably, the first divisional body 55 and the second divisional body 56 are fixed in a way such that the distances (s3) and (s6) are equal, and that the distances (s4) and (s5) are equal.

In this way, this embodiment employs a mechanism where the gap between the columnar body 7 as the rotary body 3 and the ring-shaped body 4" changes in the circumferential direction. Since the strength of the necklace vortex changes according to the gap between the columnar body and the ring, the force(s) acting on the columnar body 7 will be regulated to a given direction such that the rotation direction will be specified. Therefore, as is the case in the fourth embodiment, it is possible to control the rotation direction such that rotation will automatically start in one direction, and improve the rotational force of the rotary body 3. For example, contrary to the pattern of FIG. 22, the columnar body 7 can rotate in a direction opposite to that shown in FIG. 22, by making the distance (s3) smaller than the distance (s4) with regard to the first divisional body 55, and the distance (s5) larger than the distance (s6) with regard to the second divisional body 56.

Here, although the number of the divisional bodies in this embodiment is two, the ring-shaped body 4" may also be divided into three or more divisional bodies. Further, it is preferred that the ring-shaped body 4" be divided into the divisional bodies at a constant interval.

SIXTH EMBODIMENT

Figure 23:
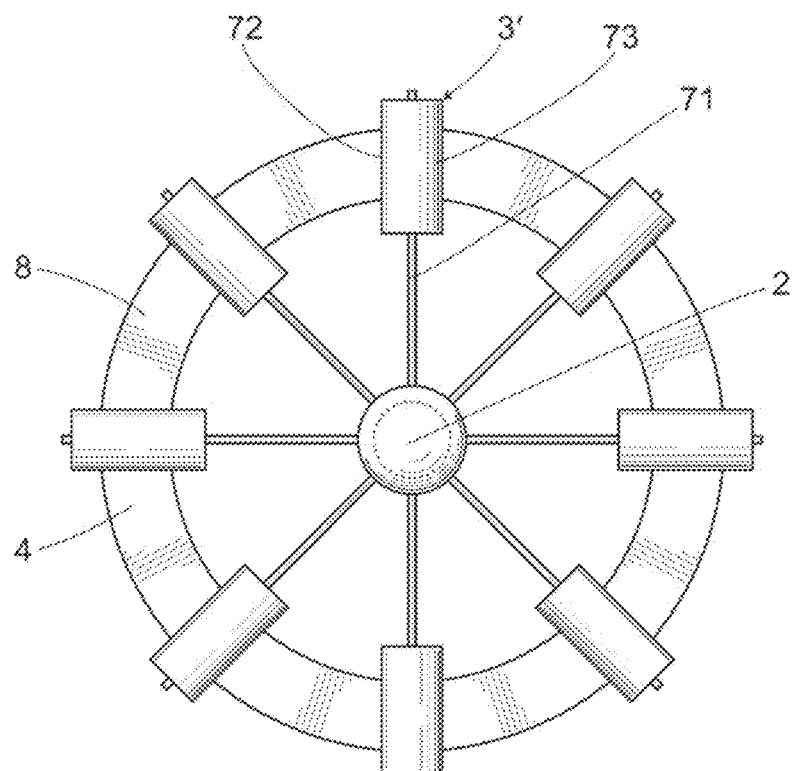
FIG. 23 is a front view showing a rotary body in a sixth embodiment of the invention.
Figure 24:
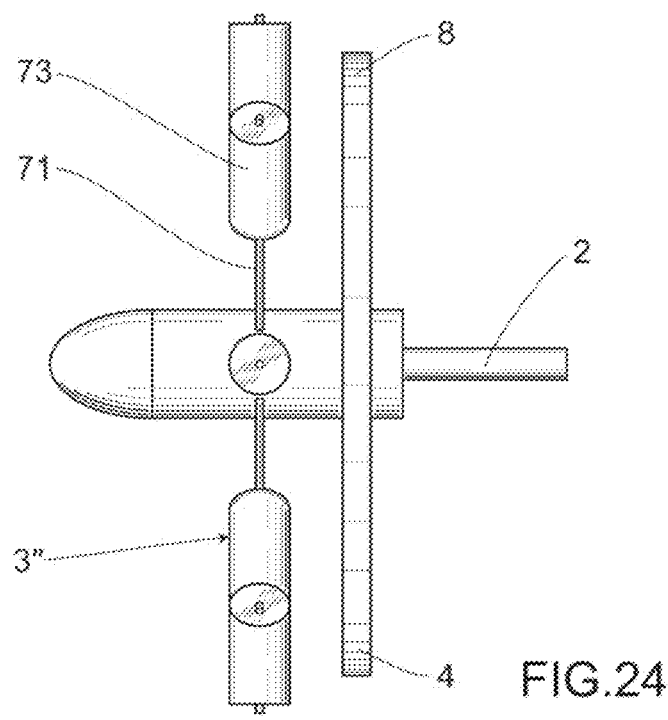
FIG. 24 is a side view of the rotary body in the sixth embodiment of the invention.

FIG. 23 and FIG. 24 show a rotary body 3" in a sixth embodiment of the invention. In this embodiment, the rotary body 3" is formed in a manner such that supporting rod portions 71 extending from the rotary shaft body 2 have thinner diameters. Further, main blade portions 73 of the rotary body 3" that intersect with the wake body 8 at crossover sections 72 have diameters larger than those of the supporting rod portions 71. Thus, since the rotary body 3" has the supporting rod portions 71 with thinner diameters and the main blade portions 73 with large diameters, the number of the blades of the rotary body 3" can be easily increased as compared to the case where the rotary body is only composed of a cylinder having a large diameter. Here, the supporting rod portions 71 may just have a strength capable of supporting the main blade portions 73; and the diameters of the supporting portions 71 may either be uniform or vary continuously or discontinuously, in the longer direction.

In the case of a conventional wind turbine, the blades thereof are subjected to both the lift force and drag force, thus leading to a concern that the blades may break when a strong wind has acted thereon. Further, there is required a pitch control device for changing the incident angle in response to a wind speed. In contrast, as for the rotary device for power generation of the present invention, the wake body 8 will be subjected to the drag force, thereby resulting in a smaller drag force acting on the blades (rotary body 3"). Thus, even when the number of the blades is increased, there can be reduced the possibility that the blades may break when subjected to a strong wind. Also, the pitch control device is no longer required.

In this embodiment, the wake body 8 is the ring-shaped body 4, and the main blade portions 73 are cylinders. In terms of an optimum design, a wind turbine with desired properties can be obtained by controlling parameters such as the width of the ring-shaped body 4; and the diameters and lengths of the cylinders.

Figure 25:
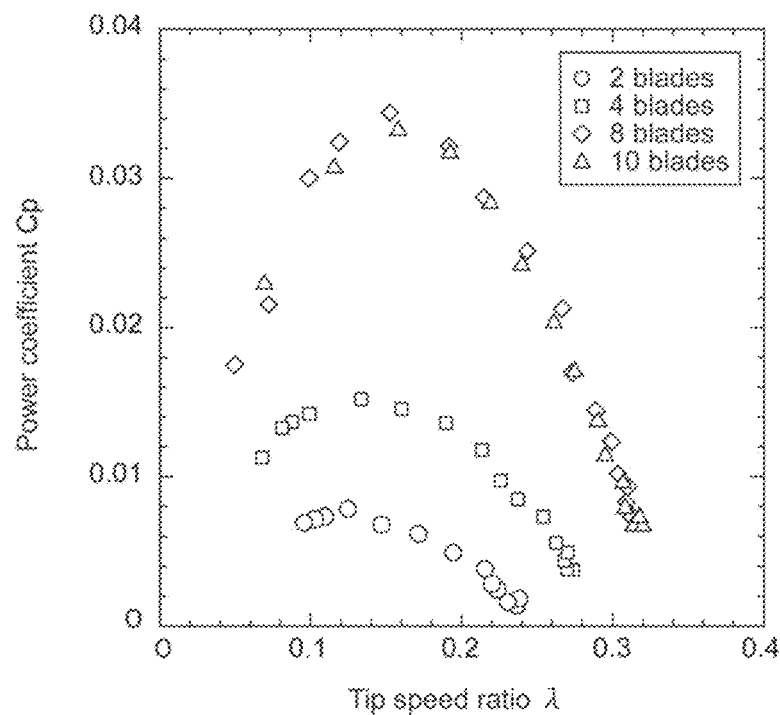
FIG. 25 is a graph showing a correlation between a tip speed ratio and a power coefficient as the number of blades is increased in the sixth embodiment of the invention.

FIG. 25 is a graph showing a correlation between a tip speed ratio λ and a power coefficient Cp as the number of the blades is increased from 2 to 10. The power coefficient Cp reached its peaks when the tip speed ratio λ was approximately in a range of 0.1 to 0.2. The power coefficient Cp then decreased beyond such range. The power coefficient Cp tended to increase as the number of the blades was increased. However, the results observed were almost the same when the number of the blades was either 8 or 10.

Figure 26:
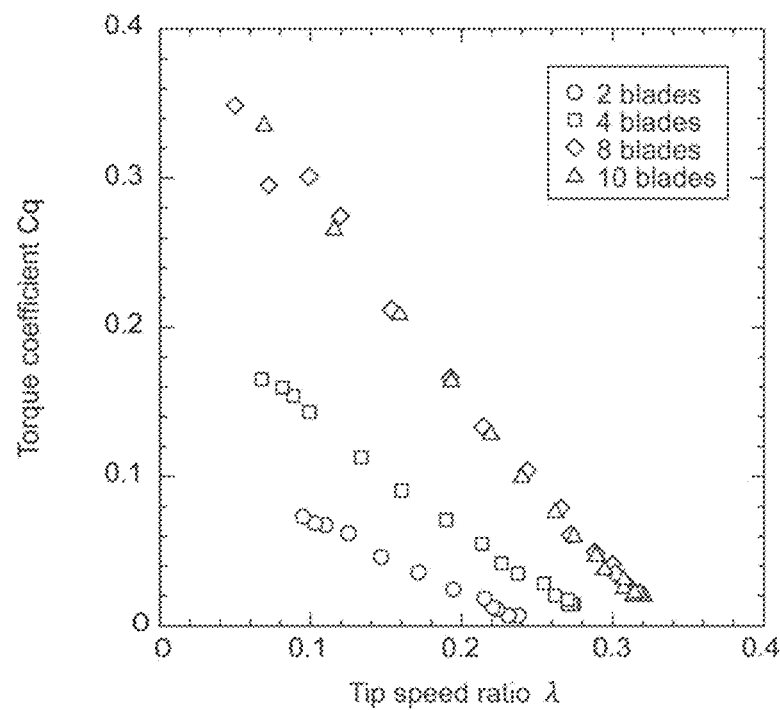
FIG. 26 is a graph showing a correlation between the tip speed ratio and a torque coefficient as the number of the blades was increased in the sixth embodiment of the invention.

FIG. 26 is a graph showing a correlation between the tip speed ratio λ and a torque coefficient Cq as the number of the blades was increased from 2 to 10. The torque coefficient Cq decreased in an approximately linear manner with respect to the tip speed ratio λ. The torque coefficient Cq tended to increase as the number of the blades was increased. However, the results observed were almost the same when the number of the blades was either 8 or 10. The maximum value of the torque coefficient Cq observed was about 0.35 when the tip speed ratio was 0.05 under eight blades i.e. it was confirmed that a high torque was able to be realized at a low speed.

SEVENTH EMBODIMENT

Figure 27:
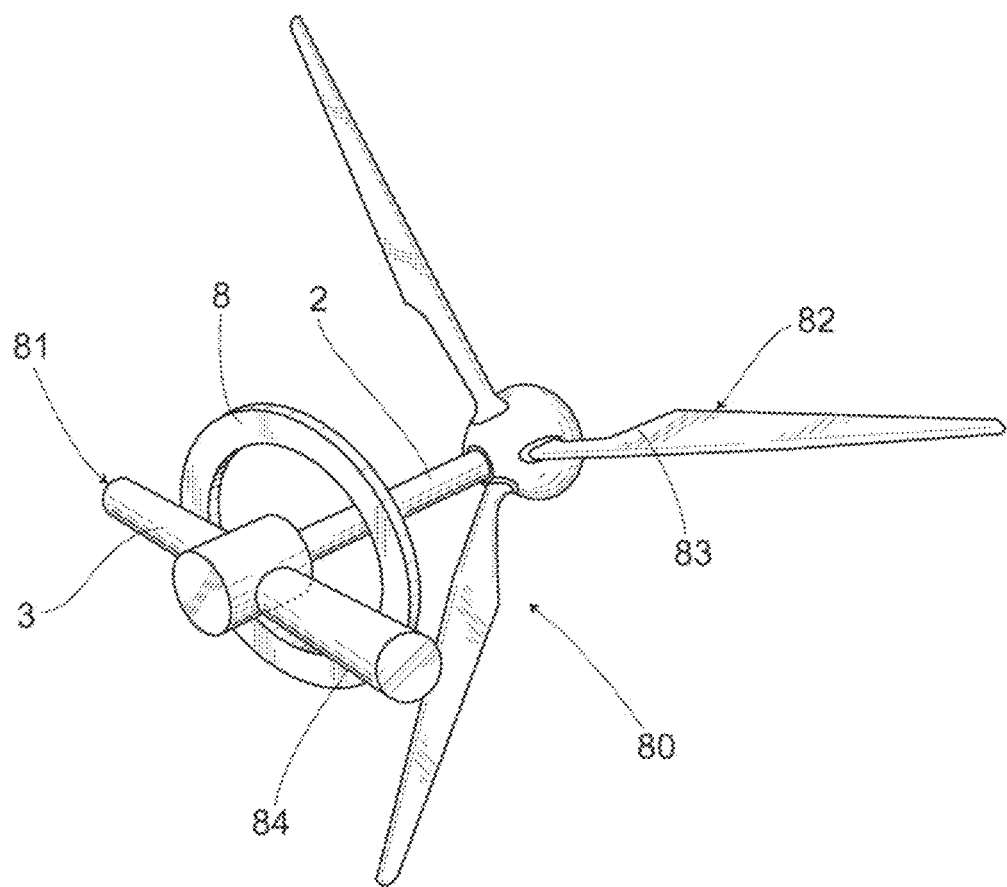
FIG. 27 is a perspective view showing a rotary body in a seventh embodiment of the invention.

FIG. 27 shows a rotary body 80 in a seventh embodiment of the invention. The rotary body 80 includes, for example, a first rotary body 81 having a columnar body as that described in the first embodiment; and a second rotary body 82 that is coaxial with the first rotary body 81, rotates about the rotary shaft body 2, and has propeller wing-shaped portions 83. The first rotary body 81 is a distance away from the wake body 8 toward the upstream side of the flow direction of a fluid. Further, the first rotary body 81, when staying at rest, has at least one crossover section 84 at which the first rotary body 81 and the wake body 8 intersect with each other.

In the case of a conventional propeller-type wind turbine, if installing another propeller-type wind turbine on the downstream side of the flow direction of a fluid, the current of the fluid will change due to the propeller wing(s) on the upstream side. For this reason, in order for the propeller wing(s) on the downstream side to achieve a lift force, the wind turbine cannot be disposed in the vicinity of the propeller wing(s) on the upstream side. However, the necklace vortex does not affect the propeller wing(s) on the downstream side of the flow direction of a fluid, thereby allowing the second rotary body 82 to be disposed in the vicinity of the downstream side of the first rotary body 81.

In this way, an inner side portion exhibiting smaller tip speed ratios is configured as a wind turbine having the rotary body 80 and the wake body 8 of the invention, and a conventional propeller-type wind turbine is then connected to the same rotary shaft body 2, thereby making it possible to achieve a high torque at a same rotation frequency.

EIGHTH EMBODIMENT

Figure 28:
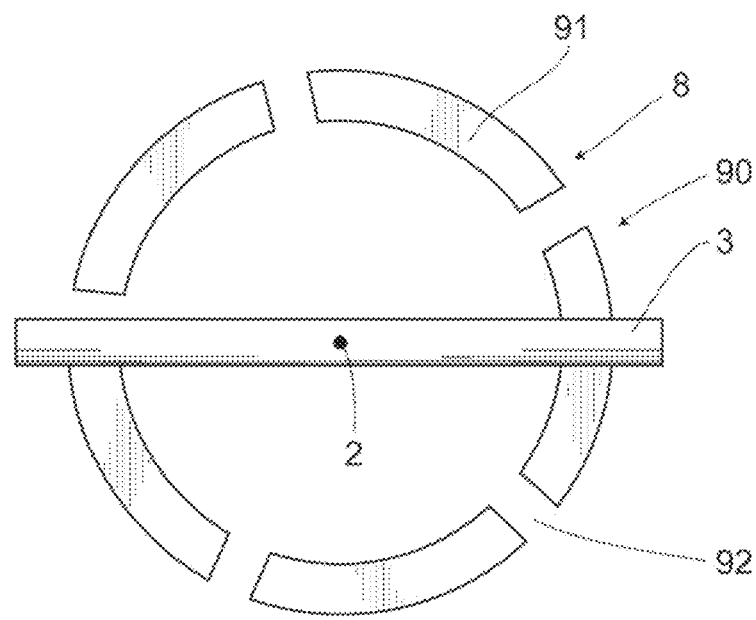
FIG. 28 is a front view showing a wake body in an eighth embodiment of the invention.

FIG. 28 shows a ring-shaped body 90 as the wake body 8 in an eighth embodiment of the invention. As is the case in the first embodiment, for example, the wake body 8 may be formed in a continuous manner with respect to the rotation direction of the rotary body 3 on the rotational plane. In contrast, the wake body 8 in this embodiment is formed in a discontinuous manner with respect to the rotation direction of the rotary body 3 on the rotational plane. That is, the ring-shaped body 90 as the wake body 8 is composed of ring portions 91 and slit portions 92. Since the wake body 8 has such a kind of slit(s), a resistance to the current of a fluid can be adjusted.

NINTH EMBODIMENT

Figure 29:
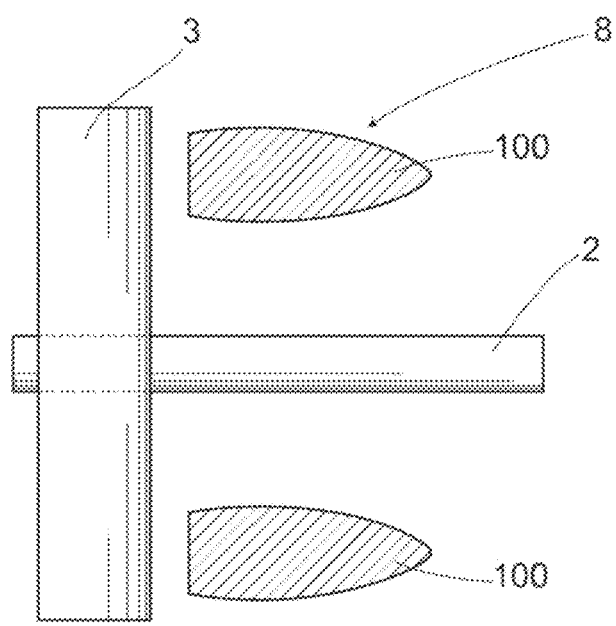
FIG. 29 is a side end view of a wake body in a ninth embodiment of the invention.

FIG. 29 shows a side end surface of a ring-shaped body 100 as the wake body 8 in a ninth embodiment of the invention. The wake body 8 is configured in a way such that the vertical section thereof gradually exhibits a streamlined shape along the flow direction of a fluid so that a resistance to the current of a fluid can be reduced. For example, as shown in FIG. 29, a central portion of the ring-shaped body 100 in the axial direction is curved in a bulged manner in the cross-sectional view. That is, in this drawing, the thickness of the ring-shaped body 100 in a direction orthogonal to the flow direction of a fluid, as indicated in the vertical section, gradually changes along the flow direction of a fluid. In this way, by reducing the resistance of the wake body 8 to the current of a fluid, the device can be used with no trouble even in a pipe in which a liquid as a fluid flows.

TENTH EMBODIMENT

Figure 30:
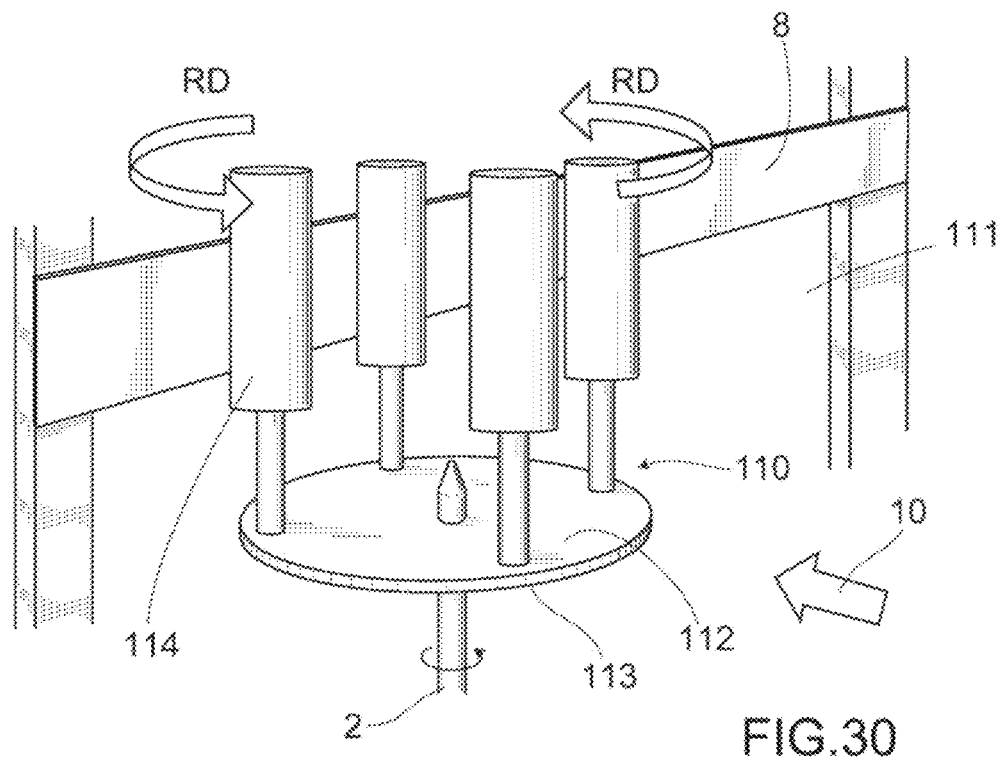
FIG. 30 is a perspective view showing a rotary body in a tenth embodiment of the invention.

FIG. 30 shows a rotary body 110 in a tenth embodiment of the invention. The longer direction of the rotary shaft body 2 is substantially parallel to a surface 111 of the wake body 8. The rotary body 110 includes a platform plate 113 having a base surface 112 substantially orthogonal to the longer direction of the rotary shaft body 2; and at least one rotary blade body 114 rising from the base surface 112.

The wake body 8 is installed behind the rotary blade body 114 with respect to the flow direction 10 of a fluid. Thus, as are the cases in the above embodiments, the longitudinal vortex will occur in between the rotary blade body 114 and the wake body 8 such that a steady lift force will be developed at the rotary blade body 114, and that a rotational force in a rotation direction RD will then be generated around the rotary shaft body 2. This rotational force allows the rotary body 110 to rotate about the rotary shaft body 2 that is perpendicular to the flow direction 10 of a fluid. Here, under a similar principle, the rotary body 110 can also rotate in a direction opposite to the rotation direction RD.

The rotary blade body 114 may, for example, have a circular cross-section. Further, in terms of generating the longitudinal vortex at the crossover section(s) to the wake body 8, the rotary blade body 114 is equivalent to the rotary bodies described in the above embodiments. The rotary blade body 114 may be a columnar body as is the case with the rotary body 3 in the first embodiment, or that having the supporting rod portions and main blade portions as is the case with the rotary body 3" in the sixth embodiment.

ELEVENTH EMBODIMENT

Figure 31:
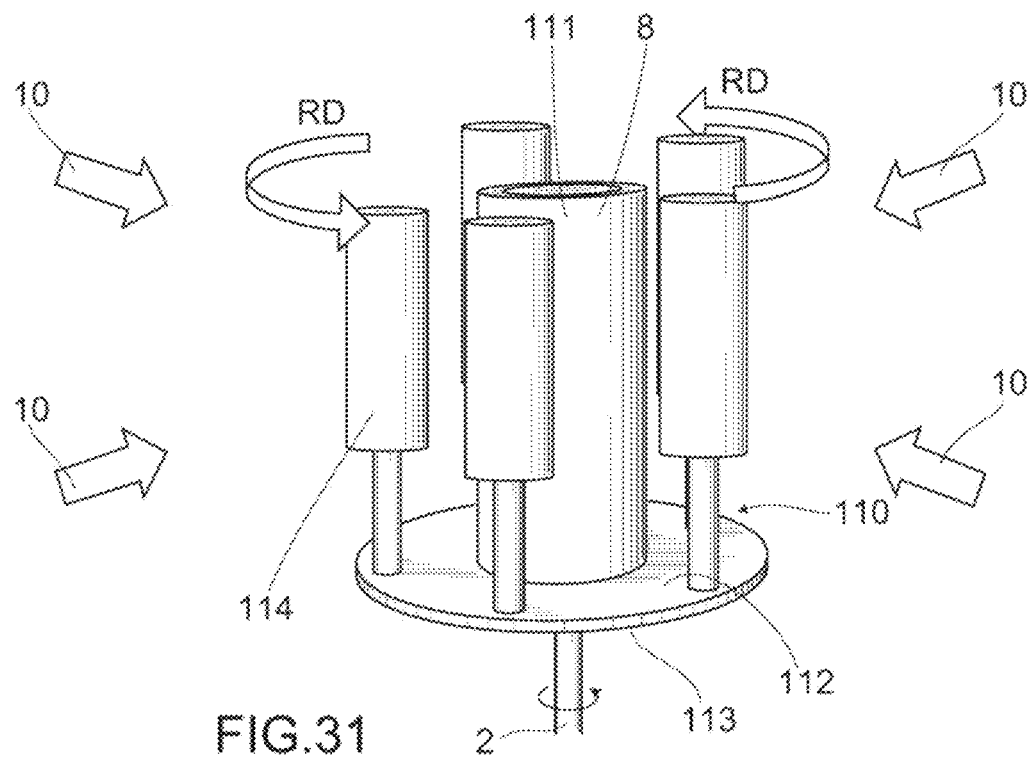
FIG. 31 is a perspective view showing a wake body in an eleventh embodiment of the invention.
Figure 32:
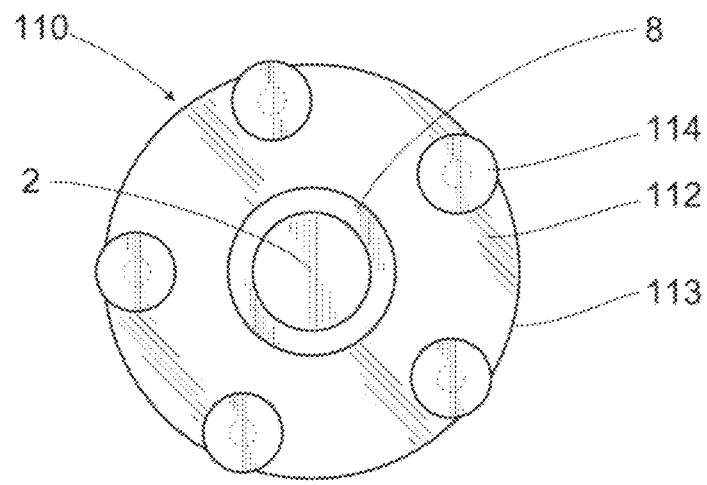
FIG. 32 is a top view of the wake body in the eleventh embodiment of the invention.

FIG. 31 and FIG. 32 show the wake body 8 in an eleventh embodiment of the invention. The rotary body 110 is configured in a similar manner as that in the tenth embodiment. The wake body 8 has a shaft center coaxial with the rotary shaft body 2, and may be formed into the shape of, for example, a columnar body such as a cylinder and a polygonal column; or a cylindrical pipe. Further, the wake body 8 is provided on the base surface 112 of the platform plate 113 in a way such that the wake body 8 is located on the inner side of the rotary blade body or bodies 114.

In this case, the wake body 8 is thus positioned on the downstream sides of all the rotary blade body or bodies 114 with respect to any flow direction 10 of a fluid. Therefore, regardless of the direction from which the fluid may flow in, the longitudinal vortex will occur between the wake body 8 and the rotary blade body or bodies 114 so that the rotary body 110 can rotate.

TWELFTH EMBODIMENT

Figure 33:
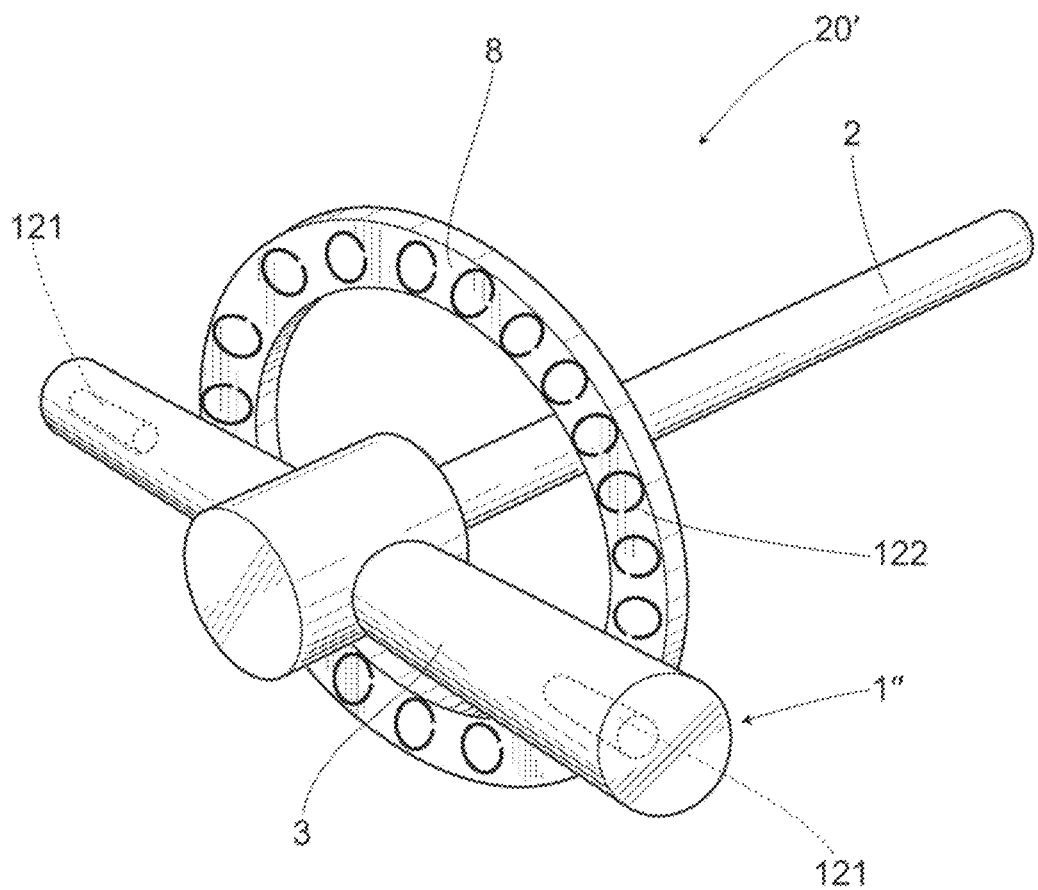
FIG. 33 is a perspective view showing a power generation device in a twelfth embodiment of the invention.

FIG. 33 shows a power generation device 20' having a rotary device 1" for power generation in a twelfth embodiment of the invention. A magnet 121 is embedded in the rotary body 3. Meanwhile, embedded in the ring-shaped wake body 8 are coils 122 for power generation that are made of a conductive material. As the rotary body 3 equipped with the magnet 121 rotates, and then moves above the wake body 8 equipped with the coils 122 for power generation, difference in potential will occur as magnetic flux changes with respect to the coils 122 for power generation as conductors. Thus, there can be achieved a frictionless power generation device 20' without a speed-increasing gear(s). Here, the magnet 121 may also be attached to the surface of the rotary body 3.

According to the rotary device for power generation of the first embodiment described above, the device includes the rotary body 3; and the ring-shaped body 4 as the wake body 8 that is a distance away from the rotary body 3 toward the downstream side of the flow direction 10 of a fluid, and intersects with the rotary body 3 at one or more crossover sections. In this way, a steady lift force will be generated due to the longitudinal vortex. Based on such unprecedented findings, and by utilizing the longitudinal vortex as a driving force, there can be provided the rotary device 1 for power generation that is capable of efficiently generating power in a wide range of flow rate without letting the longitudinal vortex disappear even if the flow rate changes in a wide range. Further, since the rotary body 3 is the columnar body 7 such as a cylinder, a tough wing-shape with a high strength can be established. Further, the gap (s2) between the rotary body 3 and the ring-shaped body 4 can be changed in response to the flow rate of a fluid. Therefore, by selecting the most appropriate clearance based on a flow rate condition(s) at the installation site, the lift force can be easily controlled, and power generation can thus be performed in an efficient manner. Moreover, the device of the first embodiment is superior in versatility, since there can be obtained the fluid power generation device 20 employing the existing rotary electric generator 13.

According to the rotary device 1' for power generation that is described in the second embodiment, the device has the eigenfrequency adjusting portion 61 equipped with the spring(s) for angularly oscillating the rotary body 3. Thus, by employing angular oscillation instead of the conventional parallel oscillation, it is easier to utilize the existing rotary electric generator 13.

According to the rotary body 3' described in the third embodiment, the rotary body 3' has the wing-shaped portion such that the rotational force of the rotary body 3' can be increased.

According to the ring-shaped body 4' as the wake body 8 described in the fourth embodiment, an appropriate shape of the ring-shaped body 4', particularly an appropriate size of the ring width (W) makes it possible for the rotation direction RD to be controlled, and the rotational force of the rotary body 3 to be increased.

According to the ring-shaped body 4" as the wake body 8 described in the fifth embodiment, the ring-shaped body 4 is divided into the multiple divisional bodies 55, 56 that are capable of mutually swinging about the axial line L2, thereby allowing the rotation direction RD to be controlled, and the rotational force of the rotary body 3 to be increased.

According to the rotary body 3" described in the sixth embodiment, the rotary body 3" includes the supporting rod portions 71 with thinner diameters; and the main blade portions 73 having diameters larger than those of the supporting rod portions 71, and intersecting with the wake body 8 at crossover sections 72. Therefore, the number of the blades can be increased without taking air resistance into consideration, and a high output becomes possible.

According to the rotary body 80 described in the seventh embodiment, the rotary body 80 includes the first rotary body 81 that is a distance away from the wake body 8 toward the upstream side of the flow direction 10 of a fluid, and has at least one crossover section 84 at which the first rotary body 81 and the wake body 8 intersect with each other; and a second rotary body 82 that is coaxial with the first rotary body 81 and has the propeller wing-shaped portions 83. Thus, it is possible to achieve a high torque at a same rotation frequency.

According to the ring-shaped body 90 as the wake body 8 described in the eighth embodiment, the wake body 8 is formed in a discontinuous manner with respect to the rotation direction of the rotary body 3, thereby making it possible to reduce the area at which a fluid collides with the wake body 8, and then adjust the resistance to the current of the fluid.

According to the ring-shaped body 100 as the wake body 8 described in the ninth embodiment, the wake body 8 is formed in the way such that the vertical section thereof gradually exhibits a streamlined shape along the flow direction of a fluid so that a resistance to the current of a fluid can be reduced.

According to the rotary body 110 described in the tenth embodiment, the longer direction of the rotary shaft body 2 is substantially parallel to the surface 11 of the wake body 8. And, the rotary body 110 includes the platform plate 113 having the base surface 112 substantially orthogonal to the longer direction of the rotary shaft body 2; and at least one rotary blade body 114 rising from the base surface 112. Therefore, there can be achieved a vertical axis-type wind turbine utilizing the longitudinal vortex as a driving force.

According to the wake body 8 described in the eleventh embodiment, the wake body 8 is a columnar body or cylindrical pipe having a shaft center coaxial with the rotary shaft body 2, and is located on the inner side of at least one rotary blade body 114. Thus, the rotary body 110 can rotate regardless of the direction from which a fluid may flow in. For example, if using the rotary device for power generation of the invention as a wind turbine, the rotary body 110 is able to rotate to generate power without having to change the orientation of the wind turbine even when the direction of the wind has changed.

According to the fluid power generation device 20' described in the twelfth embodiment, the rotary body 3 is equipped with the magnet 121, and the wake body 8 is equipped with the coils 122 for power generation. Thus, there can be achieved a frictionless fluid power generation device 20' without a speed-increasing gear(s).

Although described above are the embodiments of the present invention, various modified embodiments are also available with regard to the present invention. For example, although the rotary bodies 3, 3" and the rotary blade body 114 used in the above embodiments are those having circular cross-sections, the shapes of such cross-sections of these rotary bodies 3, 3" and rotary blade body 114 are not limited to circular shapes. These cross-sections may, for example, have polygonal shapes such as quadrangular shapes, and noncircular shapes such as oval shapes. That is, the rotary bodies 3, 3" and the rotary blade body 114 may, for example, be a cylinder; an elliptic cylinder; a polygonal column such as a quadrangular prism and a pentagonal prism; and an edge-chamfered polygonal column. This may also be applied to the shape of the columnar portion 71 of the rotary body 3'.

The wake body 8 may also be formed into a polygonal shape such as a quadrangular shape. And, holes of perforated board or the like may also be bored in the surface of the wake body 8 so that the resistance to the current of a fluid can be reduced.

Although the rotary bodies 3, 3' in the above embodiments each have two blades, there may also be used a rotary body having three or more blades i.e. there are no restrictions on the number of the blades.

In the third embodiment, although the rotary body 3 has the hybrid structure involving the columnar portion 71 and the wing-shaped portion 72, the rotary body 3 may also have a structure only composed of a propeller wing-shaped portion(s).

As for the structure allowing the gap (s2) between the rotary body 3 and the ring-shaped body 4 to be changed in response to the flow rate of a fluid, the gap (s2) may also be controlled by, for example, moving the ring-shaped body 4 through an electric motor or the like.

There are no particular restrictions on the size of the rotary device for power generation of the invention, and the device of the invention can be applied to any of a large-sized wind turbine, a medium-sized wind turbine and a small-sized wind turbine. Further, since the shape of the device of the invention is a kind of shape that can be produced even through microfabrication such as MEMS, the device can also be applied to a medium-sized waterwheel, a small-sized waterwheel and blood flow-induced micropower generation. Particularly, the low-speed high-torque property can be realized even in a small-sized rotary device for power generation. There can also be provided a rotary device for power generation that exhibits a small resistance to the current of a fluid (water) even when used in a pipe.

When the rotary body 3 is made of ceramics or the like, there can be provided a rotary device for power generation that can be used even under a high-temperature environment. Moreover, when the rotary body 3 is made of a foamed plastic such as foamed polystyrene; or urethane foam, there can be provided a light and safe rotary device for electric generator.

The invention can be carried out by appropriately combining the first embodiment through the twelfth embodiment. For example, the rotary body described in the third or sixth embodiment may be used in combination with the wake body described in the fourth, fifth, eighth, ninth or twelfth embodiment. The wind turbine of the seventh embodiment that has the first rotary body 81 may be a wind turbine obtained by combining the elements from the other embodiments of the invention which utilizes the longitudinal vortex as a driving force.

DESCRIPTION OF THE SYMBOLS 1, 1', 1" rotary device for fluid power generation
2 rotary shaft body
3, 3', 3", 80, 110 rotary body
4, 4', 4" ring-shaped body
5 electric generator
7 columnar body
8 wake body
10 flow direction of fluid
13 rotary electric generator
15, 16, 72, 84 crossover section
20, 20' fluid power generation device
45 wide width portion
46 narrow width portion
47 surface facing rotary body
55 first divisional body (divisional body)
56 second divisional body (divisional body)
58 surface facing rotary body
61 eigenfrequency adjusting portion by elastic body
71 supporting rod portion
73 main blade portion
81 first rotary body
82 second rotary body
83 wing-shaped portion
111 surface of wake body
112 base surface
113 platform plate
114 rotary blade body
121 magnet
122 coil for power generation

The invention claimed is:

1. A rotary device for fluid power generation, comprising:
a rotary shaft body parallel to a flow direction of a fluid;
a rotary body capable of rotating about said rotary shaft body in a rotational plane orthogonal to the flow direction of the fluid; and
a wake body that is a distance away from said rotary body toward a downstream side of the flow direction of the fluid, and has at least two crossover sections at which said wake body intersects with said rotary body, wherein the wake body produces longitudinal vortexes that drive the rotary body in the direction of rotation;
wherein at least a part of said rotary body that intersects with said wake body at said crossover sections is formed as a columnar body having cross-sections of circular shapes, polygonal shapes, or oval shapes; and
wherein the rotational plane of said rotary body is parallel to a flat surface of said wake body that receives a current of the fluid.

2. The rotary device for fluid power generation according to claim 1, wherein said rotary body includes:
a supporting rod portion; and
a main blade portion having a diameter larger than a diameter of said supporting rod portion, being the columnar body having cross-sections of circular shapes, polygonal shapes, or oval shapes, and intersecting with said wake body at said at least two crossover sections.

3. The rotary device for fluid power generation according to claim 1, wherein said distance between said rotary body and said wake body is adapted to change in response to a flow rate of the fluid.

4. The rotary device for fluid power generation according to claim 1, wherein said wake body is formed into a shape of a ring or a cylindrical pipe.

5. The rotary device for fluid power generation according to claim 1, wherein said wake body is formed in a continuous manner with respect to a rotation direction of said rotary body on a rotational plane.

6. The rotary device for fluid power generation according to claim 1, wherein said wake body is formed in a discontinuous manner with respect to a rotation direction of said rotary body on a rotational plane.

7. The rotary device for fluid power generation according to claim 1, wherein a vertical section of said wake body gradually exhibits a streamlined shape along the flow direction of the fluid.

8. A fluid power generation device, comprising:
a rotary shaft body parallel to a flow direction of a fluid;
a rotary body capable of rotating about said rotary shaft body in a rotational plane orthogonal to the flow direction of the fluid; and
a wake body that is a distance away from said rotary body toward a downstream side of the flow direction of the fluid, and has at least two crossover sections at which said wake body intersects with said rotary body, wherein the wake body produces longitudinal vortexes that drive the rotary body in the direction of rotation;
wherein at least a part of said rotary body that intersects with said wake body at said cross over sections is formed as a columnar body having cross-sections of circular shapes, polygonal shapes, or oval shapes; and
wherein the rotational plane of said rotary body is parallel to a surface of said wake body that receives a current of the fluid, said rotary body is equipped with a magnet, and said wake body is equipped with a coil for power generation.

9. The rotary device for fluid power generation according to claim 1, wherein said rotary body includes:
a cylindrical columnar portion including the columnar body exhibiting a circular, polygonal or oval cross-section; and
a propeller wing-shaped portion formed on both ends of said cylindrical columnar portion;
wherein said wake body intersects with said rotary body on a downstream side of said cylindrical columnar portion.

10. The rotary device for fluid power generation according to claim 1, wherein said rotary device further comprises a second rotary body which is coaxial with said rotary body, rotates about said rotary shaft body, and has propeller wing-shaped portions.

11. The rotary device for fluid power generation according to claim 1, wherein a magnet is embedded in said rotary body, and coils for power generation which are made of a conductive material are embedded in said wake body.

* * * * *